United States Patent
Ain-Kedem et al.

(10) Patent No.: US 10,616,511 B2
(45) Date of Patent: Apr. 7, 2020

(54) METHOD AND SYSTEM OF CAMERA CONTROL AND IMAGE PROCESSING WITH A MULTI-FRAME-BASED WINDOW FOR IMAGE DATA STATISTICS

(71) Applicant: INTEL CORPORATION, Santa Clara, CA (US)

(72) Inventors: Liron Ain-Kedem, Kiryat Tivon (IL); Jarno Nikkanen, Kangasala (FI)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 15/617,449

(22) Filed: Jun. 8, 2017

(65) Prior Publication Data
US 2018/0359410 A1 Dec. 13, 2018

(51) Int. Cl.
*H04N 5/235* (2006.01)
*H04N 5/353* (2011.01)
*G06T 1/20* (2006.01)
*H04N 5/232* (2006.01)

(52) U.S. Cl.
CPC ............ *H04N 5/3532* (2013.01); *G06T 1/20* (2013.01); *H04N 5/2351* (2013.01); *H04N 5/232122* (2018.08); *H04N 5/232123* (2018.08)

(58) Field of Classification Search
CPC ...................................................... H04N 5/235
USPC ............................... 348/208.99, 221.1, 223.1
See application file for complete search history.

(56) References Cited

U.S. PATENT DOCUMENTS

| | | | | |
|---|---|---|---|---|
| 6,727,942 B1* | 4/2004 | Miyano | .................. | H04N 9/735 348/223.1 |
| 2008/0068468 A1* | 3/2008 | Kitajima | ................ | H04N 9/735 348/223.1 |
| 2009/0284610 A1* | 11/2009 | Fukumoto | .......... | H04N 5/23232 348/208.99 |
| 2009/0316018 A1* | 12/2009 | Umeda | .................. | H04N 5/235 348/223.1 |
| 2011/0298945 A1* | 12/2011 | Chen | ...................... | H04N 5/165 348/223.1 |
| 2014/0232901 A1* | 8/2014 | Furuta | ................... | H04N 9/045 348/223.1 |
| 2015/0036006 A1* | 2/2015 | Xu | ..................... | H04N 5/23267 348/208.1 |

* cited by examiner

*Primary Examiner* — Anthony J Daniels
(74) *Attorney, Agent, or Firm* — Green, Howard & Mughal LLP.

(57) ABSTRACT

A method, system, and article is directed to camera control and image processing with a multi-frame-based window for image data statistics.

24 Claims, 11 Drawing Sheets

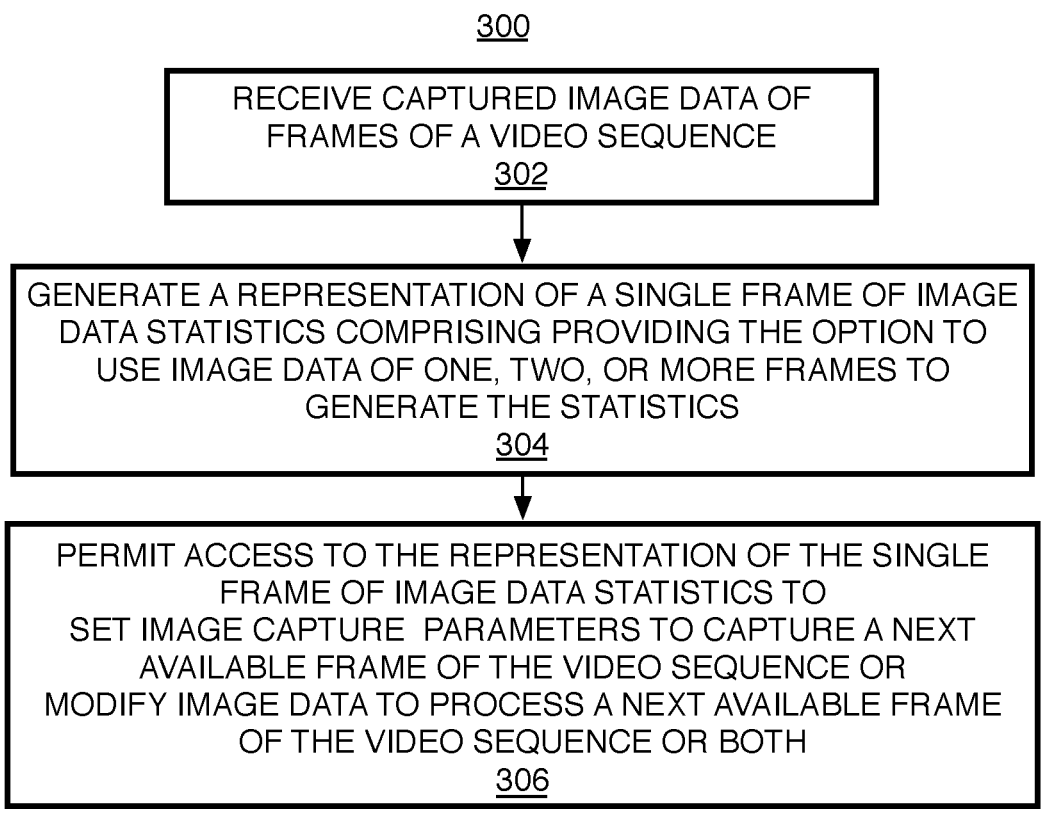

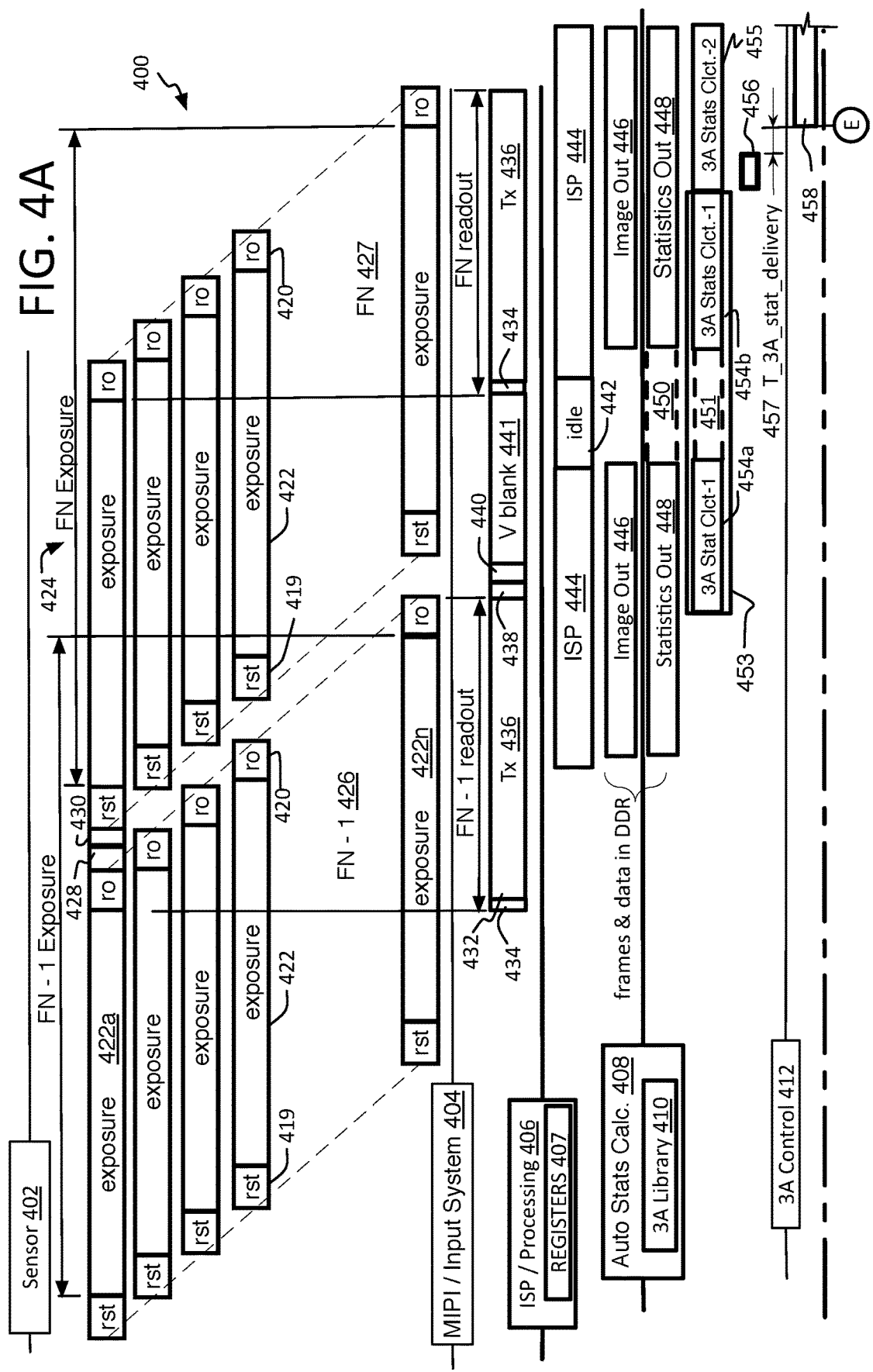

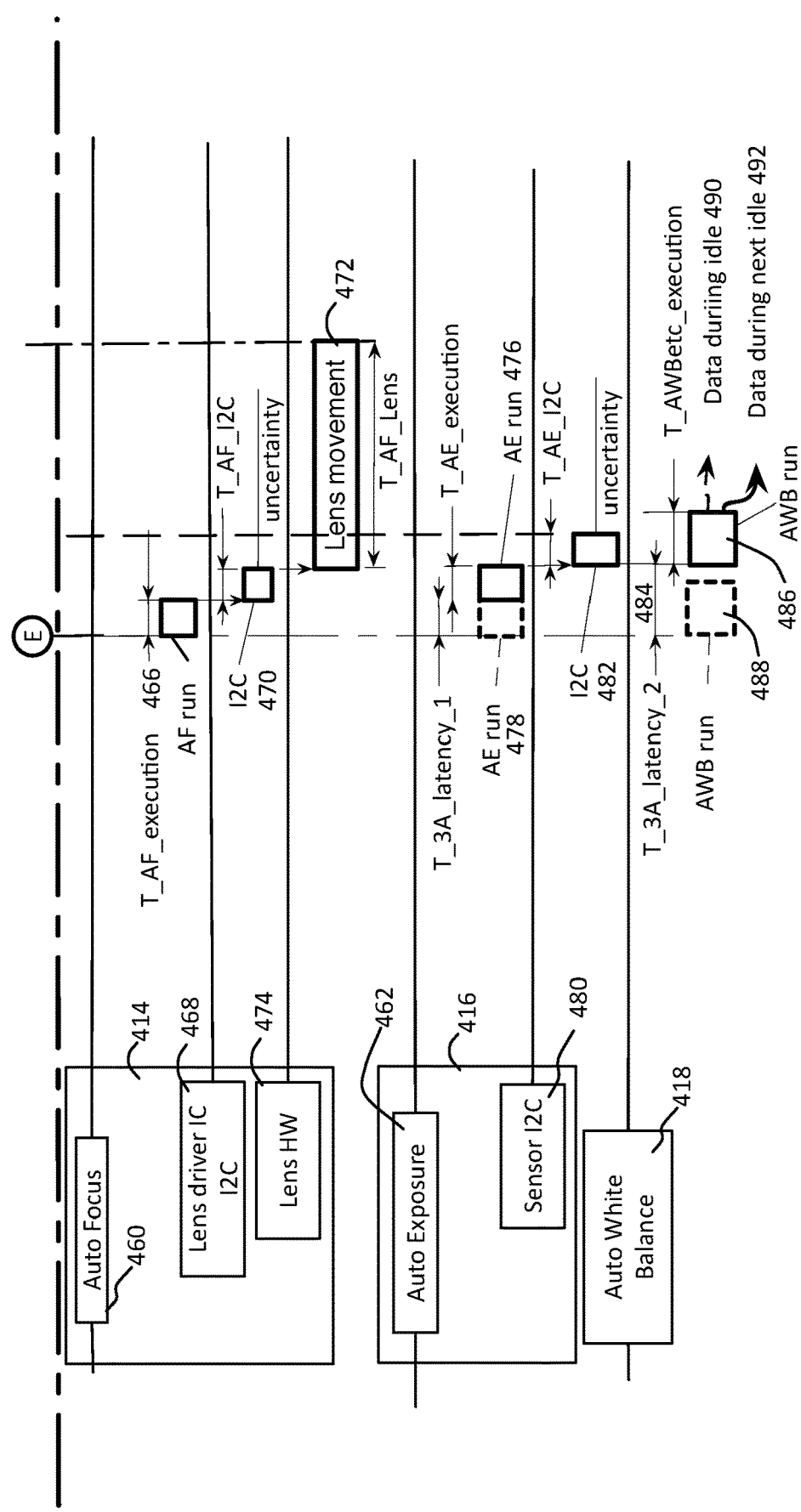

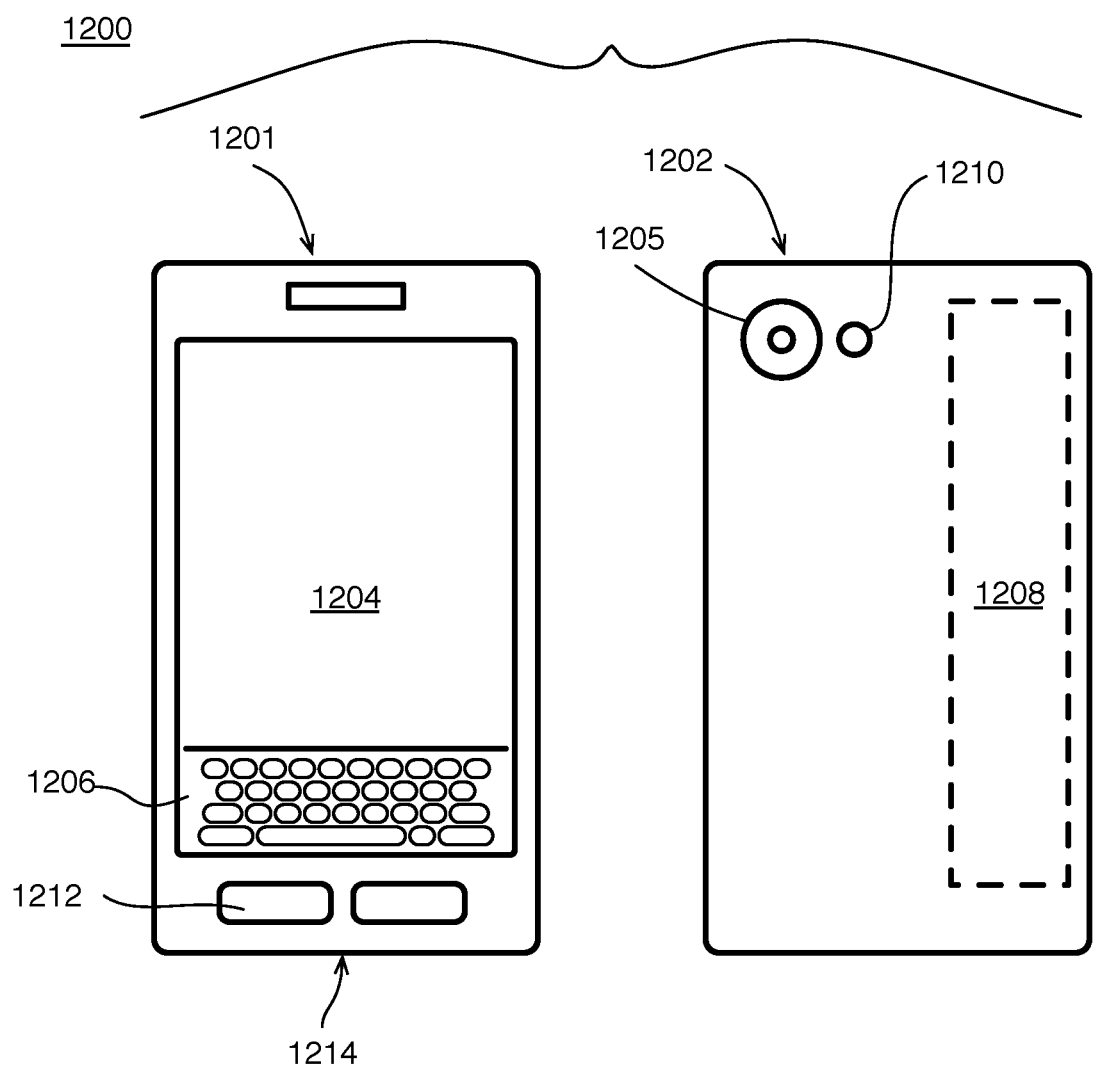

METHOD AND SYSTEM OF CAMERA CONTROL AND IMAGE PROCESSING WITH A MULTI-FRAME-BASED WINDOW FOR IMAGE DATA STATISTICS

BACKGROUND

Digital image processing devices on multi-function devices such as smartphones, or on dedicated digital cameras, use automatic features to increase the quality of an image, such as the preview screen on the digital camera as well as the recorded image and recorded video. This includes features used to set parameters to capture images such as the 3A features of automatic focus (AF) and automatic exposure control (AEC). This also includes other features that modify image data during processing of the captured images, such as the 3A automatic white balance (AWB) feature and other non-3A features or algorithms that use statistics of a frame such as Local Tone Mapping and Global Tree Mapping (LTM and GTM) for dynamic range conversion, as well as Digital Video Stabilization (DVS).

The digital image processing devices use AWB in order to provide accurate colors for pictures reproduced from captured images. AWB is a process that finds or defines the color white in a picture called the white point. The other colors in the picture are determined relative to the white point. The AWB adjusts the gains of different color components (for example, red, green, and blue) with respect to each other in order to present white objects as white, despite the color temperature differences of the image scenes or different sensitivities of the color components.

Automatic focus automatically adjusts the camera lens position to provide the proper focus of the objects in a scene being video recorded. In various implementations, digital cameras may use phase detection autofocus (PDAF also referred to as phase autofocus or phase based autofocus), contrast based autofocus, or both. Phase detection autofocus separates left and right light rays though the camera's lens to sense left and right images. The left and right images are compared, and the difference in image positions on the camera sensors can be used to determine a shift of a camera lens for autofocus. Contrast autofocus measures the luminance contrast over a number of lens positions until a maximum contrast is reached. A difference in intensity between adjacent pixels of the camera's sensor naturally increases with correct image focus so that a maximum contrast indicates the correct focus. Other methods for AF may be used as well.

Automatic exposure control is used to automatically compute and adjust the correct exposure necessary to capture and generate a good quality image. Exposure is the amount of incident light captured by a sensor, and which may be adjusted by adjusting the camera's aperture size and shutter speed as well as neutral density (ND) filter control (when present) and flash power, some of which may be electronic systems rather than mechanical devices. An ND filter is sometimes used with mechanical shutters when the mechanical shutter is not fast enough for the brightest illumination conditions. The AEC also may calculate analog gain, and digital gain when present, that amplify the raw image signal that results from the used exposure time. Together the exposure parameters determine a total exposure time referred to herein as the total exposure. The gains impact a signal level, or brightness, of the RAW image that comes out from the camera sensor. If the total exposure is too short, images will appear darker than the actual scene, which is called under-exposure, and can be so under-exposed as to become lost if the signal is less than a noise floor, or is quantized to zero. On the other hand, if the total exposure is too long, the output images will appear brighter than the actual scene, which is called over-exposure. Both cases may result in a loss of detail resulting in a poor quality image.

In order to perform these 3A adjustments and processing modifications provided by other algorithms such as the LTM and GTM mentioned above, a camera system will capture raw image data for a frame, and provide the raw image data to one or more processors, such as an image signal processor (ISP). The ISP then performs computations on the raw image data to generate 3A statistics of the captured image that basically indicate the range and location of luminance and/or chroma pixel values, or provide other statistical tables, maps and/or graphs based on the luminance and chroma values. These 3A and other statistics that are generated for a single frame of a video sequence, and on a frame by frame basis. The statistics then can be used to generate new parameters to set the camera settings for the 3A and other controls for subsequent frames.

Also in the conventional digital camera system, a certain amount of time is consumed to generate the 3A and other statistics, transfer data back and forth from the memories holding the image data and/or the other statistics, such as dynamic random-access memory (DRAM), and compute the new 3A parameters to apply to the camera settings for capture of a next image, or to modify the image data for display of the image. This amount of time usually takes too long resulting in a latency to apply the new 3A parameters so that instead of the new parameters being applied to the next frame after the current frame being analyzed, the new parameters are applied not until at least two or three frames from the current analyzed frame. This delay may result in lower quality images noticeable to a user. Some "on-the-fly" systems attempt to resolve this by reducing memory transactions and applying new parameters to the next frame whether or not the analysis is complete. This, however, also can result in noticeable artifacts and lower quality images.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of a method of camera control and image processing with a multi-frame-based window for image data statistics in accordance with at least one of the implementations herein;

FIGS. 4A-4B is a schematic timing diagram to show 3A operations while using a rolling shutter for camera control and image processing in accordance with at least one of the implementations herein;

FIG. 12 is an illustrative diagram of an example system, all arranged in accordance with at least some implementations of the present disclosure.

DETAILED DESCRIPTION

Figure 1:
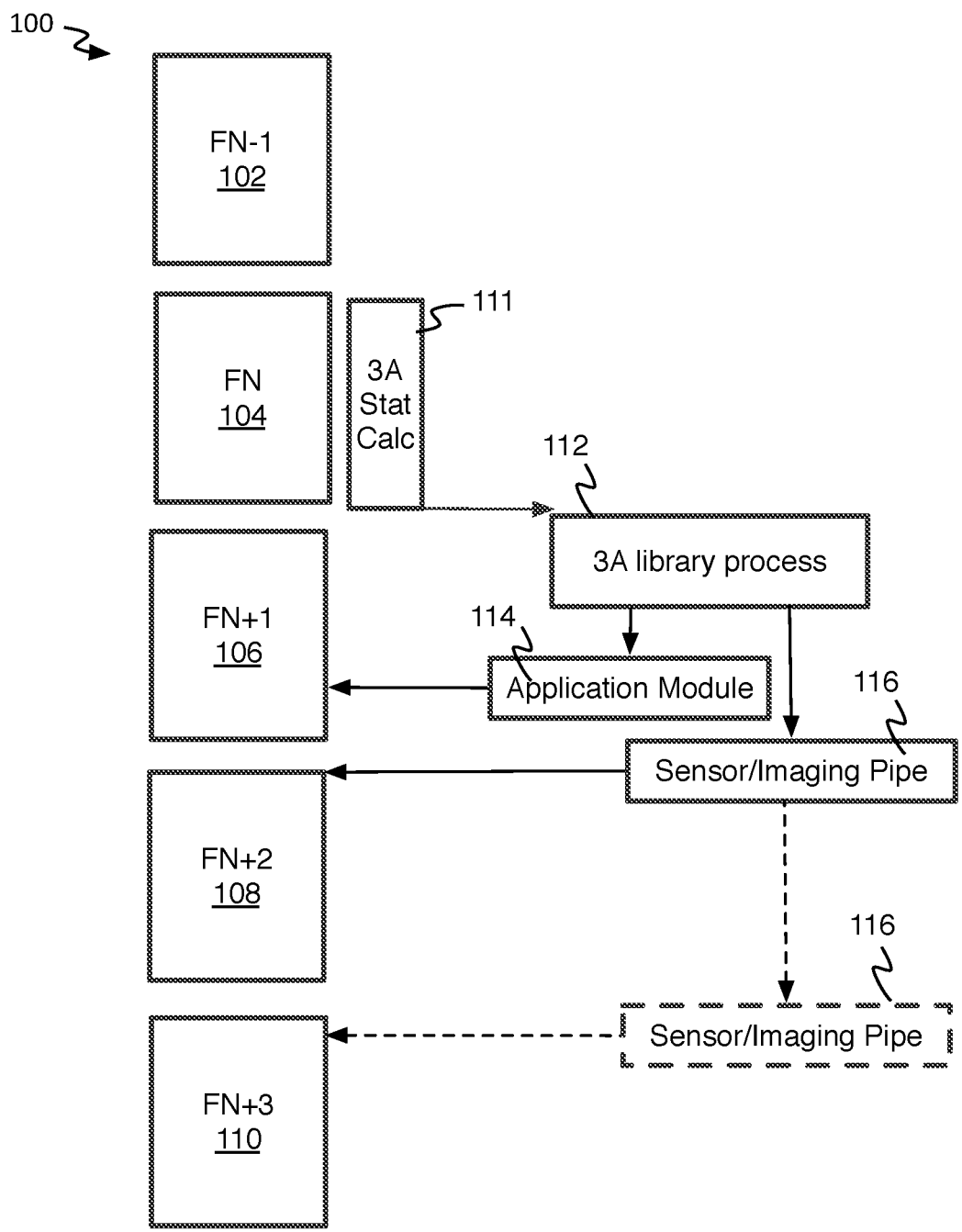
FIG. 1 is a schematic diagram of a video frame processing time chart for conventional 3A operations.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, cameras, laptop computers, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods of camera control and image processing with a multi-frame-based window for image data statistics.

As mentioned above, many digital cameras and multi-purpose devices with one or more cameras provide automatic control features such as the 3A features including automatic focus (AF) to set the lens position on a camera, automatic exposure control (AEC) to set the exposure time, and automatic white balance (AWB) to refine the color shown on a resulting image. Also as mentioned, each of these controls uses statistics in order to generate new parameters or settings to perform these functions. The generation of these 3A and other statistics is limited to a frame by frame basis. LTM or GTM (Local or Global Tone Mapping) uses these other statistics which also are per frame and used to calculate frame processing adjustments to name one possible example of other non-3A statistics that are used.

More particularly by one example in regard to automatic focus (AF), cameras may use phase detection autofocus (PDAF also referred to as phase autofocus or phase based autofocus), contrast based autofocus, or both. Phase detection autofocus separates left and right light rays though the camera's lens to sense left and right images. The left and right images are compared, and the difference in image positions on the camera sensors can be used to determine a shift of a camera lens for autofocus. Phase detection autofocus may allow a digital camera to determine the correct direction and amount of lens position movement based on a single frame of captured information.

Alternatively, automatic focusing may be implemented with contrast measurements. The contrast is typically calculated as a sum of image gradients in x (horizontal) direction (alternatively as a sum of gradients in x and y directions) in chroma or luma pixel values (or in other words, on image pixels in Bayer or YUV domain). In a contrast autofocus technique, the luminance contrast is measured over a number of lens positions until a maximum contrast is reached. A difference in intensity between adjacent pixels of the camera's sensor naturally increases with correct image focus so that a maximum contrast indicates the correct focus. In order to determine a compensating lens shift when using this technique, the 3A statistics includes a contrast or gradient map and sums thereof, and of the frame for contrast autofocus and/or a map of pixel pair intensity or color differences of left and right images for phase detection autofocus.

Another autofocus value that may be used is a measure of sharpness. Sharpness here refers to the measure of the blurriness at boundaries between areas of an image of different tone and/or color. Generally, sharpness or focus value may be calculated based on a convolution of a high pass filter with the image data calculated line by line. Modulation transform function (MTF) and spatial frequency response (SFR) are some of the techniques that may be used to measure sharpness. It will be understood that sharpness here may be a relative term measured on a possible scale available for the images and are mentioned without units.

Thus, the 3A statistics for autofocus may include a contrast or gradient map (and/or sums thereof), the differences in left and right phase images, up and down phase images, sharpness values, and/or contrast values. A low resolution representation of the image may be used as well to represent the intensity levels of the image signal. The statistics data may be extracted from multiple locations within the image reconstruction pipeline/image signal processor (ISP). For example, the data may be extracted after applying black level correction, linearization, and shading correction. Besides image statistics, the algorithms may use metadata, such as the exposure parameters that are in effect, as well as the results from other camera control algorithms, as additional inputs to the algorithm calculations. These autofocus statistics then may be used by an AF control or logic component for processing the data in AF algorithms, and making a decision as to where to move the lens next.

With regard to automatic exposure control (AEC), the statistics may include luma histograms or other intensity measurement maps, low resolution representation of the raw image, and by one example in the form of low resolution local or global luminance histograms for a frame's worth of data to be used to compute an average brightness of a frame in order to then generate a digital gain and an analog gain, and in turn an exposure time. These statistics also may be used by the other 3A controls as well.

With regard to automatic white balancing (AWB), methods such as color by correlation, gamut mapping, grey-edge, and/or grey-world AWB can be used to determine the white point and RGB gains. The 3A statistics used may include color averages for each color component (low resolution representation of the raw image).

Other general statistics that may be generated whether for use for 3A operations or other functions may include luminance and/or chrominance averages, luminance and/or chrominance high frequency and texture content, motion content from frame to frame, any other color content values, picture statistical data regarding deblocking control (for example, information controlling deblocking and/or non-deblocking), RGBS grid, filter response grid, and RGB histograms to name a few examples. One specific type of general statistic is local or global tone mapping (LTM or GTM) techniques that are used to convert between high dynamic range colors and low dynamic range for example, or could be used for other algorithms. Other statistics may be used for digital video stabilization, also referred to as electronic image stabilization (EIS), which is used in some video cameras to shift the electronic image from frame to frame of video and sufficient to counteract motion of the camera such as shaking by a user's hand. This technique may use pixels outside the border of the visible frame to provide a buffer for the motion, and reduces distracting vibrations from videos by smoothing the transition from one frame to another. The technique uses pixel data and statistics including local motion vectors, i.e., maps of motion from one frame to another and that includes the data from outside the border as mentioned.

Other general statistics can be used for the multi-frame statistics window described herein, and the description herein is not limited to any one type of statistic. In general, all of the gathered statistics can be used by any of the camera control algorithms. That is, one type of statistics is not limited to one type of camera control algorithm.

Most of these statistics in the domain of imaging and camera algorithms are conventionally calculated, gathered, and processed on a frame level. Thus, a short time window may be set in which the transmission of new 3A parameters are requested, the 3A statistics are generated, and transmitted to the 3A components for use. If the window closes before the transmission is completed, then the new settings are not used in the sensor's next image or frame, and are used in the next available frame, which may be two or three frames from the current frame being analyzed. These delays or latencies may occur due to bandwidth at the control processing unit (CPU), whether at the camera sensor control, image signal processor (ISP), or other shared processor, such that the camera control module or processor may be busy with other processing tasks. Otherwise, the delay may simply occur due to bandwidth at the data transmission pathways between any of the system components including memory transactions to and from a memory such as DRAM that stores the image data and/or the statistics. These delays increase the risk of noticeable lower quality images caused by blurred parts of the image (regarding the AF), abrupt changes in brightness (regarding AEC), and displayed colors that are wrong (regarding the AWB). Other effects or delayed functions may result from the delay of other general statistics mentioned above as well.

Referring to FIG. 1 for example, a video processing sequence 100 exemplifies these disadvantages, captured frames of a video sequence are shown including image data input from frame FN−1 (102) to frame FN+3 (110). In this example, the input data is obtained, and 3A and other statistics are generated for frame FN (104) during 3A stat. calc. period 111 and by using an ISP pipeline for example. The statistics are then stored in frame buffers or other memory such as DRAM along with the image data (unless on-the-fly operations are being implemented) and used during a 3A library process unit 112 to generate new parameters. This analysis of the statistics may occur on some processor during a Vblank or thereafter during the capture and receipt of input of frame FN+1 (106), depending on the type of statistics and amount of compute required. The new parameters are applied on the next available frame FN+1, FN+2, and/or FN+3 depending on the latency of generating the new parameters and whether the new parameters are generated before a deadline of each frame. As shown, an application module 114 could be a focus module or other 3A application module, or non-3A application module such as for dynamic range conversion using LTM and/or GTM, DVS, or so forth. The application module 114 receives autofocus parameters and may have sufficient time to apply those parameters during the input of frame FN+1 (106) to improve the lens focus for at least some of the integration or pixel lines (or rows) on frame FN+1, and set for the frames thereafter such as frame FN+2 and so on. The autoexposure or other parameters may be applied by the sensor, and the automatic white balance parameters may be applied to the image data after generation of the parameters by a sensor/imaging pipe 116. The latency shown causes the parameters to be applied to the frame FN+2 or alternatively FN+3 (as shown in dashed line) in this example. In short, a noticeable low quality image can result when these latencies do not permit the application of all of the new 3A or other parameters based on the FN (104) data to improve a more substantial portion of the immediately next frame FN+1 due to time consumed for frame buffering, and in turn more memory bandwidth and power consumption, and the other reasons mentioned above.

Also as mentioned, this may be particularly problematic with some of the algorithms if the imaging pipeline and processing are performed "on-the-fly" (OTF) without storing image data on the DRAM in order to apply the 3A or other parameters on an immediately next frame. In these cases, whatever part of the statistics could not be generated in time, or whatever part of new parameter computations could not be performed in time, are simply skipped. This may change the whole or parts of the next frame by a partial application of new parameters generated so far or up to the frame deadline that did make it into the deadline window for applying parameters to the next frame, or some 3A improvement is simply skipped. If the "on-the-fly" technique is used to apply new parameters to the next frame FN+1 whatever the condition of the new parameters, then sufficient time often does not exist to generate acceptable new parameters and applying the new parameters on time before the capture of the next frame starts (as typically applying in the middle of the frame is not acceptable and may cause undesirable artifacts).

Another difficulty occurs regarding time consumed for memory transactions with both 3A statistics and many other general statistics that are used to improve image quality. Such general statistics may include the Local or Global Tone Mapping (LTM and GTM) for dynamic range conversion mentioned above as one example. The data gathering, computation, and application of traditional 3A and other general statistics is optimal if a frame buffer is used to store the gathered data as well as the image data to generate the statistics and on a memory such as in a RAM and by one example DRAM. This provides time to analyze frame FN, for example, for LTM parameters and still impact the display of the same frame FN by applying the LTM parameters to the image data of frame N before frame FN is displayed. However, if the frame buffer is not available, intentionally in order to reduce power consumption for example, the feature using the statistics may not operate at an optimal or high quality level. As mentioned, this type of on-the-fly operation will omit generation of statistics when insufficient time exists to generate those statistics in time to improve the current frame being displayed. The image processing system then skips the application of features that improve the quality of an image but that need the statistics to operate. This applies to many features that use other general statistics or even that use 3A statistics for other purposes. The statistics calculation which is ready at the end of the FN can be applied, in the best case, to frame FN+2. This latency may cause artifacts or performance degradation especially at frames that have changing light conditions or have motion.

To resolve these issues, statistics representing a single frame of statistics are obtained from two frames effectively providing statistics in an earlier frame, or earlier during a frame capture (or ISP processing) than in the conventional system. Specifically, the method and system disclosed herein calculates 3A and other statistics based on the application time needed to generate and use the statistics to provide new parameters using a multi-frame statistics gathering window for an application rather than a purely frame-based application system. The methods make 3A and other statistics available for analysis sooner and enables smaller frame delays for "on-the-fly" modes. This is accomplished by relying on electronic rolling shutters used with many complementary metal-oxide-semiconductor (CMOS) based shutters for example and that perform continuous exposure throughout almost the entire video sequence and from frame to frame. Specifically, a global shutter exposes all lines in a frame at the same time and then reads one line after the other thereby creating a very clear clean timewise break of data between frames. Instead, in a rolling shutter, all lines of a frame start exposing at different points in time and one after the other (as shown in FIGS. 4A-4B discussed below). With this arrangement, the completion of the exposure on the later lines of a first frame (frame FN−1) may be close to or even overlap in time with the exposure of the earlier lines on the next frame (FN). Thus, the separation of data from frame to frame by using a rolling shutter is much less significant relative to time than in the case of the global shutter.

This method takes advantage of this concept by combining statistics from two consecutive frames, such as the later rows (or integration or pixel lines) of frame FN−1 and the earlier rows of frame FN. This results in an earlier completion of the 3A and other statistics analysis for at least some of the data of frame FN and that is based on a full single frame of statistics albeit using data of frame FN−1. This in turn permits application of the resulting parameters one frame earlier than the conventional process although the exact frame receiving the affect or impact of the new parameters depends on the speed and capacity of the image signal processor (ISP), camera registers that the algorithms impact to implement the 3A or other features, the 3A implementation mechanisms (lens motor for example), amount of memory transaction and the systems memory transaction bandwidth, and/or the compute time of the algorithms as explained in detail below.

Figure 2:
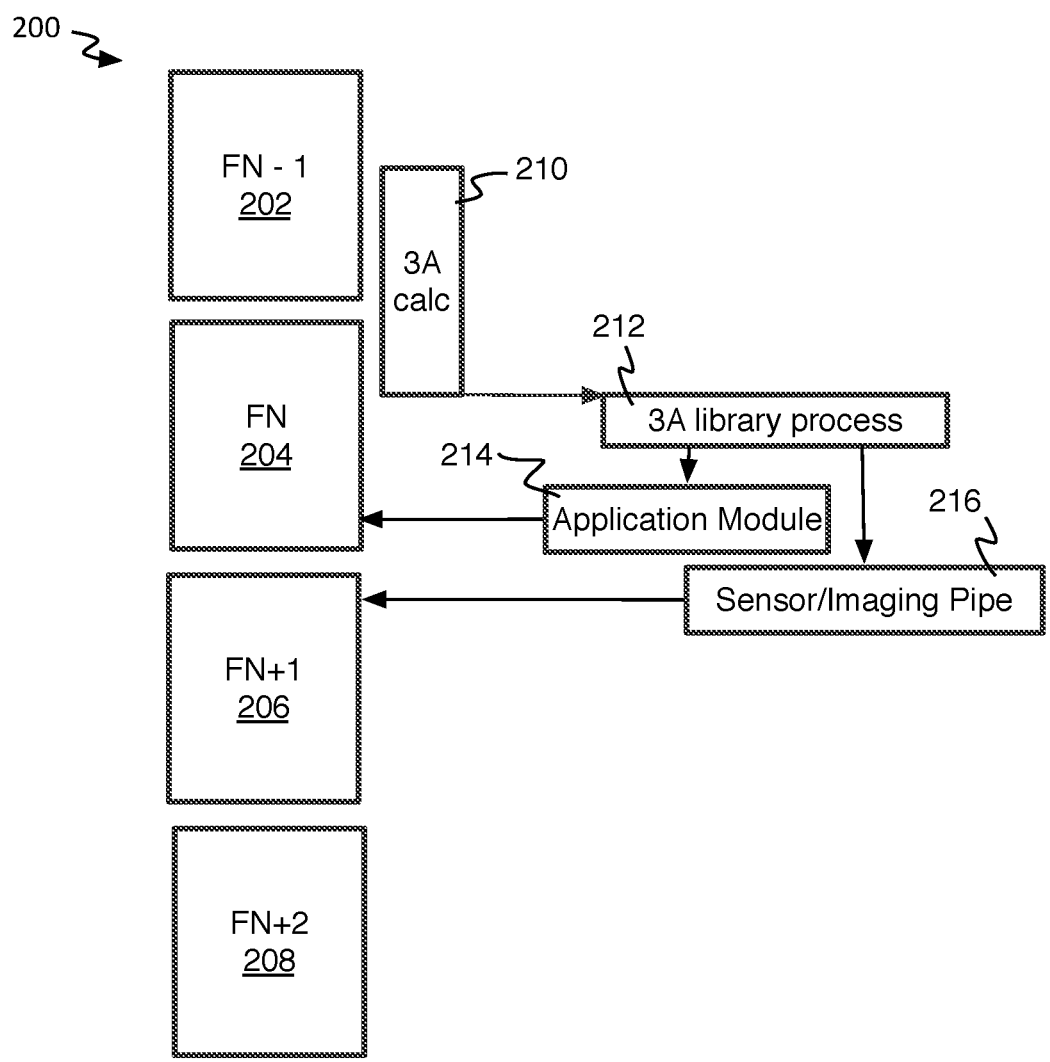
FIG. 2 is a schematic diagram of a video frame processing time chart for 3A operations in accordance with at least one of the implementations herein.

Referring to FIG. 2 for example, a video processing sequence 200 has captured frames of a video sequence including image data input from frame FN−1 (202) to frame FN+2 (208) and is shown in on-the fly mode. The on-the-fly (OTF) processing mode refers to processing done during the capture of the frames, as soon as the frames enter the ISP without going to off-chip or on-chip memory (such as RAM) for a full or partial frame delay. In this example, the system collects data to form a full single frame's worth of statistics by collecting data from parts of both a first frame FN−1 (202) and a second or current (or next) frame FN (204) during a 3A stat calc. period 210 that overlaps the input and processing time of both frames FN−1 and FN. The conventional ISP idle period and vblank period between the two frames may or may not be used to generate the statistics as well. The process shown on sequence 200 uses the on-the-fly (OTF) mode where statistics data is collected from two successive frames and used to calculate new capture or processing parameters before the next frame. As shown, the statistics may be processed during a 3A library process period 212 that generates new parameters. The new AF parameters then may be applied by a focus module 214 at least on part of the same current frame FN that was also used to generate the later part of the statistics in the first place. Otherwise, the statistics may be applied during a sensor/ imaging pipe period 216 and applied to the frame FN+1, which is only one frame ahead of frame FN. The quality of the images may be significantly improved by generation of statistics from image data of the same frame that new parameters are applied to, or merely one frame before the frame the new parameters are applied. As explained below, this arrangement also may reduce memory, bandwidth, and associated power consumption.

Referring to FIG. 3, an example process 300 for camera control and image processing with a multi-frame-based window for image data statistics described herein is arranged in accordance with at least some implementations of the present disclosure. In the illustrated implementation, process 300 may include one or more operations, functions or actions as illustrated by one or more of operations 302 to 306 numbered evenly. By way of non-limiting example, process 300 will be described herein with reference to any of the example image processing systems described herein and where relevant.

Process 300 may include "receive captured image data of frames of a video sequence" 302. In one example, a camera or image sensor may provide image data in the form of captured frames and that is placed in a bitstream of an input system and that is provided to one or more processors such as an image signal processor (ISP). This operation may include any pre-processing of image data to prepare the data to be used to generate statistics. The details are explained below.

Process 300 also may include "generate a representation of a single frame of image data statistics comprising providing the option to use image data of one, two, or more frames to generate the statistics" 304, and particularly, image data may be obtained and used to compute statistics gathered in a multi-frame statistics gathering window that extends in time over two or more frames and overlaps at least the periods of processing image data of two frames, and by one form two consecutive frames. The obtained image data, such as the chroma and/or luminance pixel values, represent the pixels that form a complete single frame, and by one example spatially represent the single frame. For example, this may include the image data of the pixels in the rows of the lower part (or bottom half) of a first or previous frame FN−1, and the image data of the pixels in the rows of the upper part (or top half) of a current frame FN. The window may start and end depending on a deadline to affect a certain frame such as frame FN or FN+1. By yet another example, a certain type of statistic may be used specifically for an identified region of interest (ROI) on the frames. In this case, the start and end of the window may be set to capture the image data of the ROI. Thus, by these forms, the duration of the window may depend, at least in part, on the type of statistic being generated, the location of the ROI (when an ROI is being targeted), and/or how much time is needed to generate that statistic. The details are provided below. By one form, the window is set so that a spatial single frame representation includes image data of exactly the same number and position of pixels as if obtained from a single frame. By one form, each of the two frames contributes half, or close to half (such as within one row), of the image data for the representation of the single frame of statistics. By alternative approaches, the window includes the generation of statistics using data from more pixel row lines from one of the two contributing frames than the other of the two frames. By one alternative form, the window has the same fixed start and end position on each first and second frame respectively, but by another alternative, the position of the start and/or end of the window may change from frame to frame depending, at least in part, on when the window has sufficient image data to start generating statistics and when it does not overlap the previous window. By yet another alternative, the frame representation may not be strictly spatial (or merely globally spatial and not locally spatial). In other words, the image data used within the multi-frame window may not be continuous row by row image data for example. In this case, the image data used for the representation of a single frame of statistics is merely located between the spatial start and end of the window but otherwise may be in any pattern, form, or order, including random selection, as long as a single frame's worth of statistics are being represented.

In some cases, the statistics of one or less than one frame from the multi-frame window is used rather than more frames, and even though the multi-frame window is being used, because some criteria has not been, or cannot be, met such as frame deadlines so that the multi-frame window cannot provide a benefit anyway, or in the case where parameters between frames has changed significantly, such as with a scene break for example, and such that the break itself impacts the statistics calculation between the frames. In this case, the system may revert back to the conventional single frame-based statistics gathering. Other criteria may exist such as speed (bit rate) or quality based thresholds for example. By other forms, when captured parameters are changed in between frames, for example from FN to FN+1, the calculated statistics may be used to form a scaling calculation to have the statistics of one frame match the statistics of the other frame as if the statistics were taken on the same frame with the same parameters. In this case, effectively, statistics from a single frame (from within the representation of a single frame of statistics from the multi-frame window) are being applied to data of another frame thereby using a single frame or less of statistics from the multi-frame window.

By yet other alternatives, the multi-frame window may include more than one frame's worth of statistics to form the representation. In this approach, an algorithm may be able to use the bottom part of FN and all of FN+1, and process the differences in the statistics of overlapping pixel locations or areas (such as pixel rows for example) or otherwise, associated areas of the frames if statistics change and require further adjustment of new calculated parameters due to lighting conditions or motion for example, and resulting in modified parameters that are then applied and may reduce or eliminate effects from changes in the lighting or motion. This may be used with LTM or AEC computations to name a few examples. In this case, 1½ frames worth of statistics are being used. It will be appreciated then that the mention of one, two, or more frames refers to up to one, two, or more frames of statistics data actually used from the statistics data gathered by the multi-frame window. The deduction of the statistics effectively may form a representation of a single frame's worth of statistics that is treated as a single frame of statistics to compute parameters.

Also, the type of statistics that are generated during the window may be statistics that are used to update camera parameters to capture subsequent images, such as 3A statistics (AWB, AEC, and/or AF), or used to modify pixel data to improve a displayed image such as with digital video stabilization or dynamic range conversion statistics (using LTM and/or GTM as described above) to name a few examples. Any of the example statistics mentioned above may be used, or any statistic that is generated on a pixel, row, block, or other basis that can be generated in units less than an entire actual frame or that is otherwise not limited to a single same capture of an image. Statistic totals, such as an average intensity or color per frame, may or may not be generated during the window, and could be generated after the window instead.

Process 300 may continue with the operation "permit access to the representation of the single frame of image data statistics to set image capture parameters to capture a next available frame of the video sequence or modify image data to process a next available frame of the video sequence or both" 306. In other words, the gathered image data that represents a single frame may be used to generate 3A statistics for autofocus, automatic exposure control, and/or automatic white balance. Otherwise, the gathered image data that represents a single frame may be used to generate general statistics to be used to perform other non-3A functions. This may include functions such as digital video stabilization, local or global tone mapping, or other methods of low to high dynamic color conversion or other functions to name a few of many possible functions. Many functions that use a single frame of image data statistics should be able to be performed using the method described herein.

By one form, the generated statistics are stored in a memory, such as RAM or DRAM, along with the image data so that an ISP can retrieve the statistics from the memory to use the statistics to compute new 3A or other image capture parameters or can use the statistics to modify image data for display of a frame. The next available frame refers to a frame with a deadline, and when statistics are generated in time to meet the frame deadline to affect the capture or display of that next available frame. Also, this could refer to affecting features on the whole frame or just part of the frame. In this form, the AF parameters might be updated and applied in the second or current frame (or frame FN as in sequence 200 (FIG. 2)), and a small portion of the current frame FN may be updated by the other 3A parameters or display modification, but not applied until the next available frame FN+1, which is one frame after the current frame FN.

The application may be applied to only part of the frame FN+1. While this may be a great improvement over statistics gathering limited to a frame by frame basis that can only update the FN+2 or FN+3 subsequent frames, as mentioned, this can still be improved by an on-the-fly (OTF) mode. An OTF mode, as described above, may be used where instead of placing the image data in RAM, and statistics when so stored in RAM, the image data is used as generated by holding the image data in a more local memory, and by one example, holding the image data in the ISP registers, and using the statistics on the image data right away to compute new parameters or modify image data in order to reduce delay caused by the memory transactions. By one example, the image data (and optionally statistics) generated from the image data of both of the frames contributing to a window is held in the ISP registers for a full OTF mode. This enables new parameters to be applied earlier to the same (or second) current frame (FN as in the sequence 200) that contributes to the window, and may include both AEC and AF parameters as well as the time to modify at least part of the image data for AWB and other features for at least a portion of the current frame FN and for the full frame FN+1. A partial OTF mode could be provided as well where the image data (and optionally the statistics generated from the image data) of one of the frames, but not both, contributing to the window is held in the ISP registers rather than the RAM. This is faster than a non-OTF mode so that more updating of the current frame could be made but is still slower than the full OTF mode as explained below.

It will be understood that the representation of a single frame of image data statistics also may be referred to as a single frame's worth of image data statistics being treated as if it has been generated from a single frame even though actually formed from the image data of multiple frames. Also, the representation of a single frame of image data statistics may be used alone or with other representations of a single frame of image data statistics or one or more actual single frame of image data statistics, and is not necessarily used alone. For example, the statistics representing a single frame could be used with other statistics of other actual frames to determine an image data value average intensity over multiple frames.

Referring to FIGS. 4A-4B, an image processing system 400 is demonstrated on a time-line chart where time runs from left to right, and includes the operation of at least a camera or image sensor 402, a camera data streaming protocol input system 404, such as a mobile industry processor interface (MIPI) or other input protocol, and one or more image signal processors (ISP) or other processor 406. One or more of the ISPs or processors 406 may operate an automatic statistics calculation unit (or statistics unit) 408 that uses image data from multiple frames to generate a representation of a single frame of 3A and other statistics, and by using a multi-frame statistics gathering window 453 as described in detail below. The statistics unit 408 also still may generate some different statistics on a frame by frame basis, and delivers the 3A and other statistics to other components. An automatic or 3A controls logic component or unit (or just automatic control) 412 provides 3A and other statistics for use by the 3A automatic adjustment controls. The system 400, or in one form the automatic or 3A control unit 412, may include operation of, or be communicatively coupled to, an automatic focus (AF) component 414, an automatic exposure control (AEC) component 416, and an automatic white balancing (AWB) component 418, a combination of any of these, and the like. These are provided here as examples and it will be understood that other applications that use these or other general statistics as described herein could be shown here as well such as applications that use the LTM and GTM described above, digital video stabilization, and others.

Now in more detail, the illustrated image sensor 402 may be controlled to operate a rolling shutter or electronic focal plane shutter process where the pixels are reset for photocharge in a line-sequential (line-by-line) fashion, and read out in a line-sequential fashion for an entire frame. In this type of system, the exposure times from row to row may overlap and need not be performed at the same time. The time between the row reset (rt) 419 and the row read-out (rd) time 420 is the integration time or exposure time (exposure) 422, which is the time used for accumulating photocharge in one or more rows of pixels on a frame (or picture or image) or even just part of a row. The length of the integration 422 may vary depending on how many rows or pixels are covered by the integration. The row read-out measures the amount of photocharge in the row and since the last reset which initiated the integration time.

The resets 419 are performed one at a time down the frame, row by row, so that here, each diagonal column 424 of exposure or integration rows 422 corresponds to a frame 426 or 427. Frame 426, and each frame, is shown with some total of exposure or integration rows 422a to 422n typical for a video display screen. Since the resets 419 are offset in time, when the exposure time 422 is the same or similar throughout a single frame, a diagonal column is formed with uniform steps. Regardless of the length of the integration 422 and position of the resets 419, the read outs 420 are timed so that the read outs will be performed one at a time for each integration row down the frame 426, forming a diagonal line of read outs 420 with uniform, or close to uniform, steps as shown. Here, the exposure times or integrations for two frames FN−1 426 and FN 427 are shown. The time period (FN−1 exposure) for capturing the brightness for a frame is measured from readout to readout and overlaps with the FN exposure of the next frame. It will be understood, however, that the lengths of the integrations 422 may vary for a frame depending on the number or portion of lines covered by the integration. In this case, the location of the resets may not form a perfect diagonal line and may be much more staggered while the timing of the readouts are maintained so that the readouts may be performed in order, and one at a time as shown. Otherwise, the length of the exposure time may be limited by the length of the frame such that exposure time cannot be longer than the frame length. This is marked by the position of the vertical (frame) blanking (vblank 441) for example which would be placed at the bottom of the diagonal column 426 (shown on the input RAW data bitstream 432) to divide the frames. The exposure between frames is almost continuous interrupted merely by the vblank period, which is typically less than 5% of the frame time. The frame length, however, can be increased by making the frame blanking (vertical blanking) longer if necessary.

The readout 420 may be separated from the next row reset 419 in the same row by a horizontal or line blanking space 428 (shown just on the first row 422*a* and as 440 on the bitstream 432) and an adjustment or reserved time block 430 (also shown just on the first row 422*a* for simplicity). Here, instead of a horizontal blanking space being placed at the end of every pixel row of a frame as for global shutters, a horizontal blanking space may be provided at the end of every integration row (which may or may not align with an end of every pixel row of a frame) for rolling shutters. The actually sensed area in total line length (horizontal) as well as number of lines in a frame (vertical) may be larger than the visible space on a device or to be analyzed. Thus, horizontal or line blanking is a non-transmission period covering the time of a scan of pixel positions along a line and that is not visible. The same is true for vertical blanking introduced below. The blanking spaces are used for synchronization. Horizontal or line blanking may be used to provide a component (such as an ISP) sufficient time to handle incoming data. For example, ISP processing can fail (such as with an input buffer overrun) if the line blanking is too short compared to the pixel clock, or the rate at which a sensor is sending data. Vertical or frame blanking is used to control the frame rate where the longer the vertical blanking, the slower the frame rate, the longer the maximum possible exposure time, and the more time to perform calculations before read-out of the next frame starts. The reserved time block 430 also may be used after the horizontal blank 428 and before the next reset 420 of the same row to limit or prevent any overlap of readout periods.

By one approach, an input data or bit stream 432 having data from the sensor(s) 402 may have a start of field (SOF) 434, a main transmission portion Tx 436 of the RAW image data for multiple overlapping rows in the integration column 426 that are associated with a single frame 426, for example. In the illustrated form, the data for the readouts 420 of all of the integration rows 422*a*-422*n* are placed in the main transmission portion Tx 436. The main transmission portions 436 end at an end of field (EOF) 438 followed by a horizontal blanking time 440, and then a longer vertical blanking period 441 may be provided when the end of one frame is reached and the data for the next frame begins. Horizontal blanking time 440 in the bit stream 432 increases the time that it takes to read out the full frame to allow the receiving side (such as the ISP 406) to empty its input buffers before the next line is sent, for example. By another alternative, the horizontal blanking is not used where the horizontal blanking is zero or non-zero, and virtual pixels could be transferred during line blanking or not transferred.

Other data in addition to the chroma and luminance data in the raw image data may be stored in memory, such as exposure data including the exposure time, and analog and digital gains. This data is then provided to an ISP as needed to generate statistics and/or new 3A or other parameters.

Figure 5:
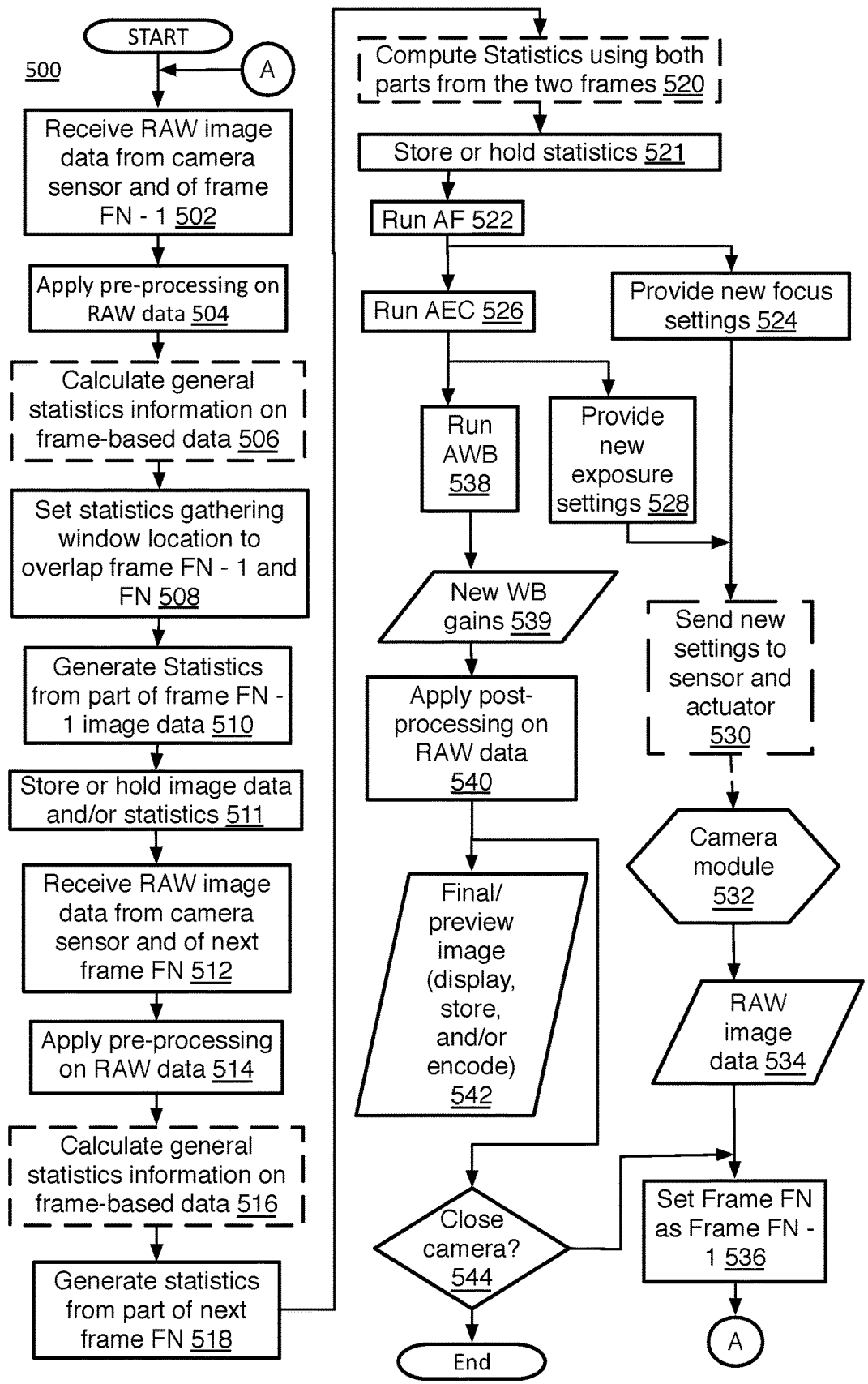
FIG. 5 is a detailed flow chart of a method of camera control and image processing with a multi-frame-based window for image data statistics in accordance with at least one of the implementations herein.

Referring to FIG. 5, much of the remaining description of the operation of system 400 may be described in conjunction with a process 500 for camera control and image processing with a multi-frame-based window for image data statistics. Process 500 described herein is arranged in accordance with at least some implementations of the present disclosure. In the illustrated implementation, process 500 may include one or more operations, functions, or actions as illustrated by one or more of operations 502 to 544 numbered evenly. By way of non-limiting example, process 500 will be described herein with reference to example image processing system of FIGS. 4A-4B and 10, as well as the on-the-fly-related processes shown in FIGS. 6-8.

Process 500 may include "receive image data from camera sensor and of frame FN-1" 502. Frame FN-1 refers to the first (or earlier or previous) frame of the two frames that contribute image data to form the representation of a single frame of image data statistics used herein. The second or current frame FN is introduced below. By one form, the two frames are consecutive, and only two frames are used. By another form, the image data of more than two frames could be used or even less than one frame as described above.

In one example, once the ISP 408 receives raw image data, process 500 may include "apply pre-processing on the RAW data" 504. This may include noise reduction, pixel linearization, and shading compensation. It also may include resolution reduction, Bayer demosaic, and/or vignette elimination, and so forth.

These operations are exemplified on time-line 400 by the operation of the ISP/processing unit 406 at time periods 444 that retrieve and analyze the raw image data including providing pre-processing, with idle periods 442 between the receipt of adjacent frames and corresponding to the horizontal blanking period 440, corresponding to hblank period 428, and vertical blanking period 441. The ISP 406 may have ISP registers 407 to hold data or context being worked upon. The resulting image data is provided at image-out time periods 446 where the image data is stored in memory, such as DRAM, cache, or other memories as needed. It will be understood that the image analysis periods 444 and image-out periods 446 very well may extend through the hblank period 440 and into the vblank time period 441 to complete the image data analysis and generation.

Turning now to the operation of the statistics unit 408, optionally some general statistics still may be generated on a frame to frame basis (in addition to the use of the multi-frame window) as shown by frame-based statistics out windows 448 divided by periods 450 between the frames. Thus, once pre-processed, general image statistics information may be calculated 506. This may include luminance/chrominance value combinations such as averages, luminance/chrominance high frequency and texture content, motion content from frame to frame, any other color content values, picture statistical data regarding deblocking control (for example, information controlling deblocking/non-deblocking), RGBS grid, filter response grid, and RGB histograms to name a few examples. A number of these statistics, whether used for 3A features or other non-3A features, could be generated by using the multi-frame statistics gathering window instead as discussed below. These frame-by-frame statistics may be provided on a macroblock or coding unit (CU) basis (for example, per 16×16, or 8×8, or other size block of pixels), or may be provided per pixel, per frame, or other unit basis as desired depending on compatibility parameters for certain standard coding schemes such as H.264/Advanced Video Coding (AVC) or High Efficiency Video Coding (HEVC), JPEG or other image processing and encoding standards. These standards may be used at the end of post-processing when YUV data is available and the ISP has reconstructed the images. These general statistics may be stored in a double data rate (DDR) DRAM or other sufficient memory, and then may be provided for further analysis during the time period image out 446 and the frame-based statistics out period 448.

Process 500 also may include "set statistics gathering window location to overlap frames FN−1 and FN" 508. By one example, a multi-frame statistics gathering window 453 extends over both frames FN−1 (426) and FN (427) as well as a dividing time period 451 between the frame-statistics time periods labeled 3A stat. cict−1 (454a) and (454b). The window 453 extending over both frames refers to extending over the ISP processing periods of the two frames but could also refer to corresponding to, or extending over, the exposure times of the frames. In the present example, the exposure time of FN−1 ended by the time window 453 started, but the window still extends over both ISP processing periods 444 of the two frames FN−1 and FN. A next statistics gathering time period 3A stats Clct.−2 (455) may be used to form the next multi-frame statistics gathering window for the lower part of the current frame FN and the upper part of the next frame FN+1 (not shown). During the two frame-statistics time periods (also referred to as the first and second window parts) 454a and 454b within the window 453 image data is obtained, and 3A or other statistics are computed using the image data. During the dividing time 451, the statistics unit 408 may continue to compute statistics even though image data is no longer being obtained from the previous or first frame FN−1. This permits statistics to be generated generally or substantially continuously throughout the multi-frame statistics gathering window 453, and during the vblank 441, and during (or actually eliminating) the image data processing idle 442. The idle 442 still may be reserved by the ISP to apply new 3A parameters and implement 3A modifications. The image data retrieval and use for statistics generation then restarts at the second or current frame FN in the second frame-statistics time period (or second window part) 454b.

By one approach, the end of the window 453, and in turn the start of the window 453, may be determined depending on the deadline to apply new parameters to a certain next frame, whether that next frame is the same second frame FN forming the window, the following frame FN+1, or any target frame thereafter. The start and end of the window depends on a number of factors. For instance, the new parameters based on the statistics should be sent before the next frame capture or processing (depending on the algorithms and the parameters). Also, in order to set the starting time to start gathering the statistics over the two frames, the system should consider the new parameters' propagation time (I2C command for example), worst case calculation time by the CPU (or ISP), and the frame time. The total time then can be translated into the frame time (position) in which the statistics gathering is started. If any such deadline is not met for any reason, the new parameters could be applied to the next frame as a mitigation. The deadline is calculated from the latest time the parameters must be sent (through I2C or Register Write or other means) considering the time it takes to send the new parameters—counting back to how much time the CPU uses to calculate the new parameters (depending on the algorithm) and from there, the time for frame statistics gathering can be calculated, and the start time can be set.

By one specific example for AEC, the multi-frame statistics gathering window can be set so that the deadline of an ISP 3A or other parameter update such as a camera sensor register write deadline can be met. This may refer to meeting the deadline for a frame FN+1, but could even refer to the deadline for at least part of frame FN depending on whether or not an on-the-fly mode is being used, and the type of on-the-fly mode as explained in detail below. Also for AEC, if the algorithm using the statistics determines a variation with regard to brightness difference from frame to frame, then the exposure difference between frame FN−1 and FN portions, and determined by analyzing the statistics from those portions, should be normalized. The normalization may include setting a lower total exposure gain to match a higher total exposure. However, usually consecutive frames will not have significantly different exposures due to the temporal stabilization that is conventionally applied in exposure control.

Thus, by one form, the length of the window is set as mentioned above by determining the length of time that should be needed to gather statistics, calculate new parameters, and propagate the new parameters all to meet a frame deadline.

By an alternative form, the start and end of the window may be fixed for each pair of frames. In one case, each of the two consecutive frames FN−1 and FN provides image data and statistics of exactly half of the pixel rows of a single frame, wherein the first frame (FN−1) provides the image data of the lower half of the frame, and the second frame (FN) provides image data and statistics of the upper half of the frame. When an odd number of pixel lines (or integration lines) are provided in a frame, one of the two consecutive frames may provide the data and statistics of the center row, or the center row may be provided by both consecutive frames by splitting the center frame along its length. By other examples, some overlap may exist particularly when statistics include the computation of a local average or other combination pixel value so that image data values of a single pixel location or block location may be used as spatial neighbor contributors for a pixel value average for example of two target pixel locations that each contribute to a different half of the statistics generated in the window 453.

By other forms, one of the two frames contributing to the multi-frame statistics gathering window may contribute image data of more integration or pixel lines than the other frame of the two. By this form, the window may start when a sufficient amount of the image data is already generated and may be obtained to form certain statistics. The window length then may be set to process a single frame's worth of statistics so that the window extends into the next or second frame to accomplish this. The next window then starts where the previous window ends so that, by one example, there is no overlap of use of image data to form the statistics. By this option, the window length it still set based on retrieving a frame's worth of image data and the time it should take to generate the statistics based on that frame's worth of image data. By this form, the window has a definite predetermined length for generating the frame's worth of statistics. By one form, this may be some average window length for the type of statistics being generated, or may be based on the type of statistic that takes the longest amount of time to compute. Note that statistics gathering for each kind of statistics and algorithm is often done per an ROI (Region Of Interest). Thus, the multiple frame statistics gathering is done to accumulate all the required statistics spatially so that an entire frame view will be captured. However, this may be subject to the ROI which may be smaller than the full frame and thus may influence the start point and end point in each frame in which statistics is gathered or used to correspond to the location of the ROI on the frame or frames.

By yet another option, instead of restricting the window lengths to accommodate a predetermined definition of a frame's worth of statistics, the window for a subsequent frame may be set depending on the actual time it took to generate the statistics for a prior frame. Thus, once the statistics are completed, then the next window is started for the current frame and the following frame. In this case, there is no fixed location for the start and end of the window relative to the image data retrieval of certain pixel lines of the frame.

Process 500 then may include "generate statistics from part of frame FN−1 image data" 510. Here, the ISP has already pre-processed the image data, the image data is being retrieved, and is being used to generate statistics. By one example, this is occurring during the multi-frame statistics gathering window 453 and particularly the frame-statistics time period 454a for the first or previous frame FN−1. This may include generation of statistics generally based on image data from the later half (or lower half, bottom half, or lower integration or pixel lines) of the frame FN−1, or alternatively other portion of the frame.

Examples of the type of contents of the statistics, as mentioned above, may include 3A statistics and non-3A statistics. During this window 454a, the statistics are being gathered or generated as the image data is obtained, and as soon as sufficient image data is obtained. This may be performed on a pixel basis, block basis, integration row basis, or other unit as needed. The details of the type of 3A statistics for autofocus (AF), automatic exposure control (AEC), and automatic white balance (AWB) are already recited above.

Also as mentioned, general statistics that can be used with the multi-frame statistics gathering window 453 during this window 454a for the first frame FN−1 may include local or global tone maps (LTM or GTM for example) for dynamic range conversions and/or other applications, or motion content from frame to frame and outside-border pixel tracking for digital image stabilization, as well as other general statistics that may be generated whether for use for 3A operations or other functions, and may include luminance and/or chrominance averages, luminance and/or chrominance high frequency and texture content, any other color content value combinations, picture statistical data regarding deblocking control (for example, information controlling deblocking and/or non-deblocking), RGBS grid, filter response grid, and RGB histograms to name a few examples. Other general statistics can be used for the multi-frame statistics window described herein as well, but the description herein is not limited to any one type of statistic.

Figure 6:
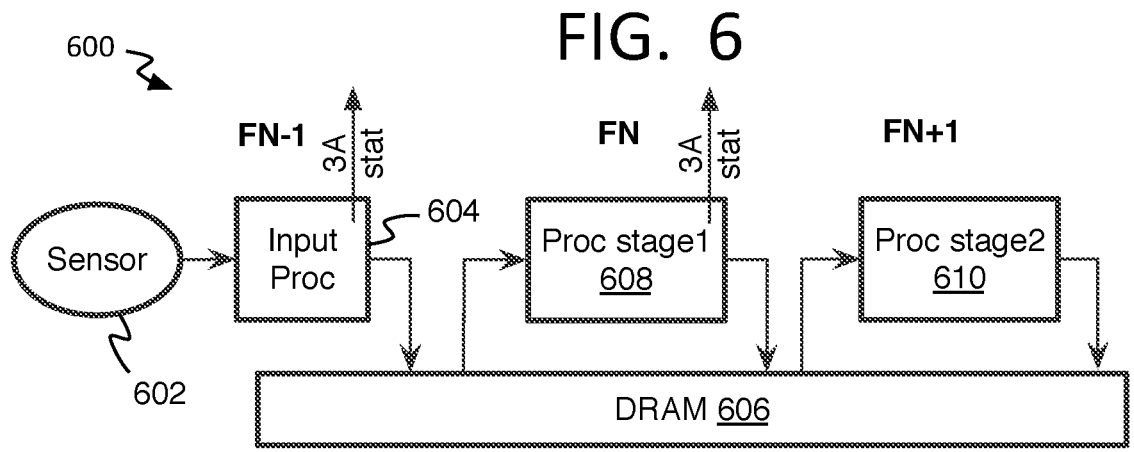
FIG. 6 is a schematic diagram of a process of 3A operations in a non-on-the-fly mode in accordance with at least one of the implementations herein.

Referring to FIG. 6, process 500 may include "store or hold image data and/or statistics" 511, and particularly either storing the image data (and optionally the statistics as well) in an external or "off-board" or "off-chip" memory such as RAM (or on-chip RAM) or holding the statistics in ISP registers or other close or local memory (more local than RAM at least) for immediate processing of 3A parameters with the statistics. Specifically, the statistics may be stored in a buffer or 3A library 410 (FIG. 4) for example, and that is formed by "off-board" memory such as a RAM, and specifically DRAM or double data rate (DDR) DRAM. A system 600 shows this process where a sensor 602 captures images of a video sequence, and then input (or initial) processing 604 on a frame FN−1 includes the 3A statistics generation during the earlier or first window 454a for example. This statistics data along with the image data is then stored in memory such as DRAM 606. This is repeated in the second window 454b for frame FN at a processing stage 1 unit 608, where the previously stored statistics from the first window 454a and the images may need to be retrieved when those statistics are the base (level 1 statistics) for further statistics (level 2 statistics explained below) to be computed in the second window 454b, and then the remainder of the 3A statistics are generated and stored in the DRAM 606 (this operation of generating statistics with the second window 454b on the frame FN is covered in process 500 by operations 512 to 520 described below). As mentioned above, the end of second window 454b, and in turn multi-frame statistics gathering window 453, may be set at an application deadline to provide sufficient time to provide new parameters to affect frame FN, FN+1, or other subsequent target frame. The 3A statistics are then retrieved from DRAM and provided to a processing stage 2 unit 610 to generate 3A parameters or otherwise use the statistics. This is also detailed below in process 500. It will be appreciated this process 600 also applies to non-3A statistics as well.

While the statistics may be ready for analysis earlier by using the multi-frame statistics gathering window, it will be understood that each transmission to store and retrieve image data (and statistics) to and from the DRAM also may cause delay and uses memory bandwidth, and therefore requires more memory capacity and power consumption than if such transactions and memory usage could be eliminated or reduced. Accordingly, a partial or full on-the-fly mode may be used that uses ISP registers to hold the generated image data while the ISP uses the statistics to run 3A operations and generate new 3A parameters. The image data (and the statistics) are not downloaded to DRAM or other off-chip or external memory in this case. This permits a smaller memory and lower power consumption thereby improving the computer or device performing the processing. It also reduces latency so that the effect from new parameters based on the statistics can take place up to a frame earlier than the process that stores the image data (and statistics) in RAM. The result may be an increase in the quality of the images that are captured and displayed, and an increase in the quality of the viewing experience as well as the reduction in required memory capacity and power consumption.

Figure 7:
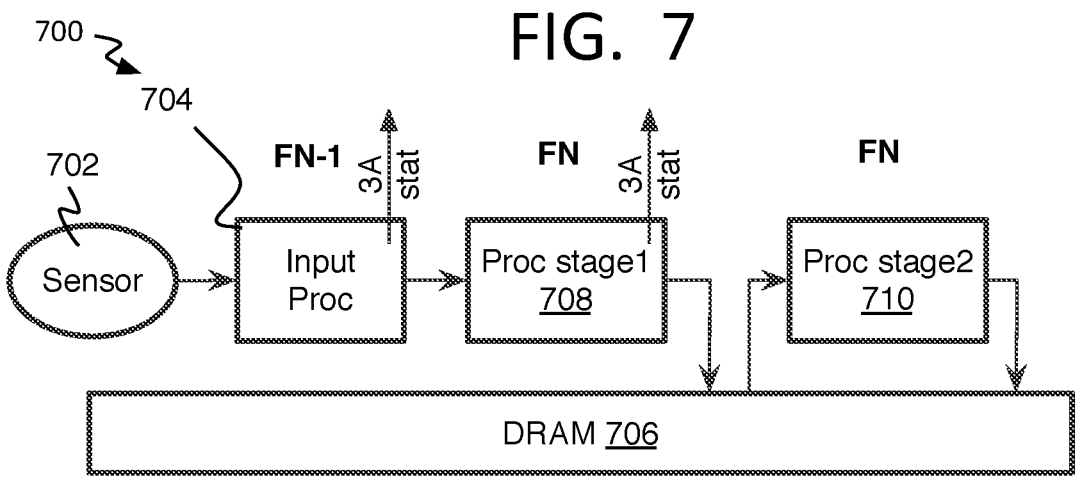
FIG. 7 is another schematic diagram of a process of 3A operations in a partial on-the-fly mode in accordance with at least one of the implementations herein.

Referring to FIG. 7, a partial on-the-fly process is described on a system 700 as one example. The units and operations are mainly the same as that of the system 600 except that instead of the image data (and statistics) being stored on a DRAM, here, after the input processing 704 generates statistics in the first window 454a of the multi-frame statistics gathering window 453, the image data and statistics are held in the ISP registers, such as registers 407 (FIG. 4) to be used right away as generated, and to determine whether new parameters should be generated and then to generate those new parameters. The statistics data may be considered to be part of a 3A library no matter what memory the statistics are stored in once generated. The image data (and statistics) are held in the registers rather than being placed in RAM. By one form, this refers to all of the statistics for a particular purpose or a particular type of statistic, say all statistics relating to an average color component for the window 454a, or all statistics for a group of statistics for a particular application, such as all statistics for automatic focus. Other variations could be used such as holding a portion that is less than all of such statistics in registers rather than using RAM for storage. Thus, system 700 shows that the next immediate operation is generation of statistics in processing stage 1 708 where the remainder of the statistics, such as 3A or other general statistics are generated during the second window 454b and while retrieving the image data of the upper or earlier portion (or integration or pixel lines, and at least the top pixel line(s)) of the frame FN. Since this operation is a partial on-the-fly operation, the image data and statistics of the second window 454b of frame FN are still placed in DRAM 706, while the image data and statistics of the first window 454a of frame FN−1 were held in the ISP registers 407. This may be used when insufficient capacity exists in the ISP registers to hold the image data (and the statistics) of both the first and second windows. It also may be possible to perform the opposite process where the image data and statistics from the first window 454a and input processing unit 704 for frame FN−1 are placed in DRAM while the image data and statistics from the second window 454b for frame FN and the processing stage 1 unit 708 are held in the ISP registers.

With the partial on-the-fly mode system 700, the system still may have sufficient time to apply new parameters based on the statistics sooner due to the holding of the image data and statistics of the first window 454a in the ISP registers. For example, processing stage 2 unit 710 may use the generated statistics from both windows 454a from frame FN−1 and 454b from frame FN to compute and apply new parameters to frame FN, which provides more time to analyze the statistics and apply the new parameters in time to make the deadline to affect frame FN+1 or even towards the end of frame FN itself. Likewise, for those applications that take longer to implement, this may be a frame or earlier than the conventional system that would first affect frame FN+1 rather than FN+2 (or FN+2 instead of FN+3), or in other words, generally can affect the quality of the capture and display of the images one frame earlier. This may make a significant difference in 3A implementations as well as other general statistics implementations such as e.g. motion artifacts in LTM to name one example.

It will be understood that a CPU and/or other processor(s) could perform such processing rather than, or in addition to, the ISP. It also will be appreciated that the registers may be registers of more than one ISP, and/or registers of another type of processor (CPU, and so forth). The ISP may be part of a system on a chip (SoC) or other architectures, a number of which are mentioned elsewhere herein. In addition to registers, the image data and statistics may be held on other memories that are at least more local then an off-chip RAM, DRAM, or other type of RAM whether an ISP or other processor that is performing the statistics generation or analysis. This may include on-chip memories that are on the same chip or board as the processor.

Figure 8:
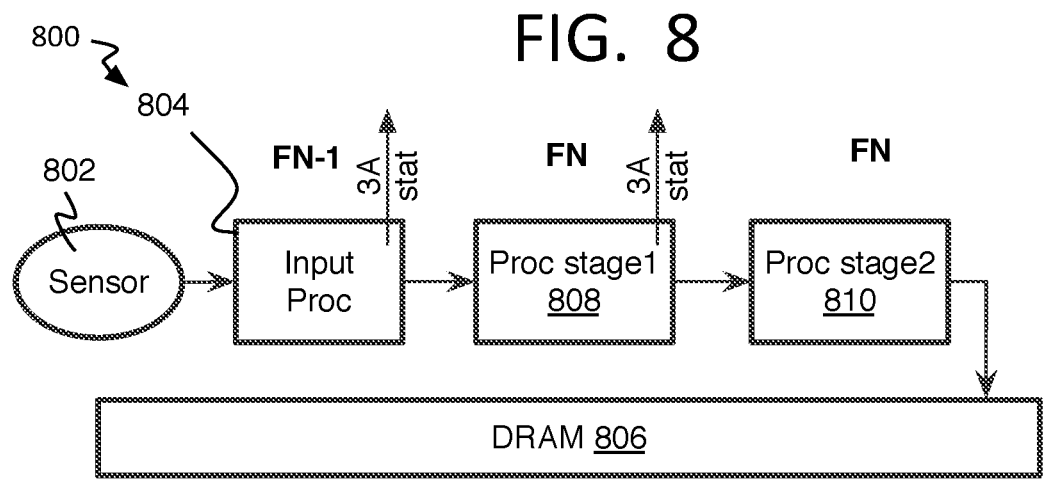
FIG. 8 is another schematic diagram of a process of 3A operations in a full on-the-fly mode in accordance with at least one of the implementations herein.

Referring to FIG. 8, a full on-the-fly process is described on a system 800. The units and operations are mainly the same as that of the system 600 and 700 except that instead of holding image data and statistics generated from just one of the statistics processing units (804 or 808) in ISP registers, the image data and statistics from both processing units 804 and 808, and in turn from both statistics windows 454a and 454b from both frames FN−1 and FN respectively, are held in local memory, such as the ISP registers, while analyzing the statistics to generate new parameters rather than storing the image data and statistics in RAM.

For the full on-the-fly process, the statistics generation that occurs for frames FN−1 and FN could end even earlier than the partial on-the-fly process so that statistics gathering ends at the middle (or other configurable point) of FN where all the spatial information exists and allows the algorithm to process it and issue new parameters, if needed, for even earlier application deadlines that occur during the retrieval and processing of the frame FN. In this case, new parameters may be applied even earlier to frame FN when possible providing improvements to a greater portion of the frame FN than partial OTF, and application may occur to affect the entire frame FN+1, depending on the application.

By one form, however, the partial or full OTF may have reduced feature sets (e.g. no image-based DVS, no or limited geometric distortion correction, reduced resolutions, and so forth) so that more capacity exists at the ISP registers or memory for holding the image data and statistics and to better avoid further delays.

Continuing now with process 500, process 500 may include "receive RAW image data from camera sensor and of next frame FN" 512, and now the retrieval of the image data of the frame FN is performed, and process 500 may include "apply pre-processing of RAW data" 514 to prepare the data for statistics computations, as in operations 502 and 504 described above for frame FN−1.

Then, process 500 optionally may include "calculate general statistics information on frame-based data" 516, also as described above for frame FN−1 (operation 506), where other frame to frame statistics still may be generated.

Process 500 may include "generate statistics from part of next frame FN" 518, where here the ISP has analyzed the image data, the image data is being retrieved, and is being used to generate statistics as mentioned for frame FN−1. Now, this is occurring during a later portion of the multi-frame statistics gathering window 453, and particularly the frame-statistics time period 454b for the second or next frame FN. This may include generation of statistics generally based on image data from the earlier half (or upper half, top half, or upper integration or pixel lines) of the frame FN, or alternatively, other portion of the frame that includes the top or upper-most pixel lines of the frame FN.

It also will be understood that the processing during the second window 454b (or during the second processing stage 1 units 608, 708, or 808) may include multiple levels (or operations) of computing statistics. For example, first level statistics may refer to a color map or color histograms of the image data, or gradients of the image data, where a single or low number of computations are being performed. Then, second level statistics may use the first level statistics for further computations, such as sums of gradients by some unit (such as pixel lines or blocks), or an average for a frame using those first level statistics. A third level may use those second level statistics and so forth until the statistics are in some final form usable by the applications such as the 3A components or other general video quality applications, and so forth. The second window may be used to perform second or higher level statistics computations on the first level statistics computed in the first window 454a. Of course, depending on the type of statistics, such as line-based gradient sums, some of the second or other level statistics also may be computed during the first window 454a when sufficient data is available.

Eventually, process 500 may include "compute statistics using both parts from the two frames" 520. By one form, when an entire frame statistic (or single value that represents an entire frame) should be based on a frame's worth of data provided by using both windows 454a and 454b for frame FN−1 and FN respectively, such a value as with an average color or luminance for the entire frame, may be computed during the second window 454b when all of the data is available from a certain level of statistics. Otherwise, such final frame-level statistic may be considered to be computed after the second window 454b in a time period 456 (FIG. 4) for the ISP, for example, to be making such a computation. This time period 456 also could be used to compute other 3A or general statistics as well. These further 3A statistics also may or may not be considered to be performed by the automatic control 412 (FIG. 4).

Process 500 may include "store or hold statistics" 521, and this operation is as explained above to store the generated statistics from the second window, or any statistics (such as the described higher levels or frame-level statistics) in DRAM, or to hold the statistics in processor or ISP registers to proceed with an OTF mode as described above.

Once the statistics are computed, the statistics, if not delivered already, may be delivered to the automatic control 412 during a time period T_3A_stat_delivery 457. The automatic or 3A control 412 then may use the statistics, whether stored on a RAM or held in ISP registers as described above, and in order to determine whether new 3A parameters are needed, and then to compute the new parameters when needed. The application of the new parameters then may be applied. These operation regarding the use of the statistics generally may be applied during a 3A implementation time period 458 (FIG. 4). It will be understood that the implementation time period 458 may be much longer than shown extending over multiple frames when necessary. It will be understood that other general statistics applied for display modification may have similar timing.

As mentioned above, the automatic control 412 may be considered to include the AEC component 414, the auto exposure component 416, and the automatic white balance component 418, and also could be considered to include the automatic statistics calculation unit 408 as well. The following is merely one possible example for performing 3A operations with the control 412 breaking down the time period 458 for the individual 3A components, and many variations are possible Process 500 may include "run AF" 522. Particularly, once the 3A statistics are available, 3A control and adjustment also may be performed, which may be performed one after another, or in one case where each control feature may have one or more dedicated processors, they may be performed in parallel. In the former case, the AF control 414 has an AF logic or component 460 that receives 3A statistics during a time period (T_3A_stat_delivery) 457. Once the 3A statistics are received, the AF logic unit or component 460 runs and calculates focus adjustments during a period T_AF_execution 466. In one form, a lens driver 468 with i2c protocol then forms the commands for new focus settings 524 during a time period T_AF_I2C 470 after the AF execution period 466, and then send 530 the new AF settings to the camera module or sensor 532 so that lens hardware 474 on the camera then may move the lens during a period T_AF_Lens 472. The lens hardware may or may not be considered a part of the AF control 414.

By one form, the AF control 414 still can use the statistics from the frames whose integration time is overlapping with the time T_AF_lens 472 for the lens movement. For that frame, here frame FN+1 for example, the commands may meet the deadline for frame FN+1 due to the use of the multi-frame window 453 and OTF modes as explained above. Otherwise, the system herein may be used with fixed focus camera modules that do not have AF, such that the methods here are applied to other types of statistics and algorithms such as for AE, DVS, LTM, and so forth.

Then, process 500 may include "run AEC" 526. Regarding AEC, when the processor(s) are being shared among the 3A controllers, a first latency period (T_3A_latency_1) may delay the running of the automatic exposure control 416 until the AF control 414 finishes the AF adjustment calculations 466. The AE logic or component 462 of the AE control 416 may run the exposure adjustment calculations during a time period (T_AE_execution) 476 to form new or updated exposure settings for the camera sensor. Alternatively, in a system with dedicated components, the auto exposure run 478 may occur while the AF control 412 is executing the AF adjustments 466. A sensor I2C component 480 may then provide 528 and send 530 the new exposure settings to the sensor and during a time period T_AE_I2C 482.

Note that at both the I2C transmission for the AE and AF commands, the word uncertainty is stated to indicate potential delay may occur at this point due to the time period 470 and/or 482 taking longer than indicated. It should be noted that the time for providing extra digital gains to the ISP for processing does not directly depend on the timing of the AEC, AF, and AWB runs 466, 476, 486 or I2C transmissions 470, 482. Also, if some other parts of the system are competing for the same I2C or CPU resources, this may cause a variation in AE run time (T_AE_execution) as well as the AE I2C execution time (T_AE_I2C) or to any other part that needs those resources. This becomes even more important because it is beneficial to provide the AEC run or analysis with a flexible time envelope for every frame so that more thorough analysis can be performed for every frame or at least certain frames that require more in-depth analysis.

Relevant herein, automatic exposure control (AEC) uses algorithms to adjust the exposure parameters to capture images and to provide adjustments for the brightness parameters for the display of an image, whether on a live preview screen of the digital camera, or other recorded display, and storage or encoding of the image or video for later viewing. When the parameters are being updated at a sufficient speed, the brightness in the live preview screen or in a recorded video will appear to change smoothly from frame to frame without noticeable flickers or abrupt changes in brightness such that a smooth convergence of brightness (or a noticeable, stable brightness) is attained. This provides the image a carefully controlled, high quality appearance. In order to achieve such smooth and sufficiently fast updating of the exposure parameters, the updated parameters are provided to a camera sensor for example, at a rate of at least about 30 Hz. A delay may occur when the processor performing the AEC calculations receives the latest exposure parameters from a camera sensor late.

A dedicated processor may be provided to run 3A algorithms to ensure that no other processing will delay the AEC processing. Otherwise, dedicated i2c controllers may be added to ensure that no other traffic delays 3A traffic. Alternatively, the system may strictly enforce the processing time limit allocated for an AEC algorithm. This solution, however, may still be insufficient, and may require the additional hardware anyway. Such limitations are very difficult to implement, and the resulting target brightness that is set by AEC might not be optimal in all image capture situations because not all required analysis can be guaranteed to occur in the given strict processing time limits for all frames.

Next, the camera module 532 may use the new settings to capture further images and provide new RAW image data

534 to restart the cycle as shown in FIG. 5. To restart the cycle, or loop the process, the frame FN is now the frame FN−1, and a new frame is now the current FN frame (536), and the process loops to operation 502 where the raw image data is to be received for processing.

Regarding AWB, the process 500 may continue with "run AWB" 538 and refers to running the AWB control 418 after a second latency period (T_3A_latency_2) 484 from the receipt of the 3A statistics. In this case, the processing may not begin until after the auto exposure execution period 476 is complete. Then, the AWB control performs adjustment calculations that provide new white balance (WB) gains 539 during a time period (T_AWBetc_execution) 486 after the second latency. As mentioned above, AWB algorithms such as color correlation, gamut mapping, grey-edge, and/or grey-world AWB methods can be used to determine the white point and RGB gains. For the grey-world method, as an example, the averages for all color components are calculated, and then an appropriate gain is applied for each color component so that the averages become equal to each other. The calculations result in an initial or regular WB gain for the image. The regular WB gains may refer to three gains for the primary colors (R, G, B for example). This operation may also establish an initial white point. Alternatively, if a dedicated processor is provided, the AWB run may occur during a period 488 while the AF and AE controls are performing their adjustment calculations.

ISP parameters for processing the images (to display, store, and/or encode for example) may be updated with data 190 or 192 including 3A adjustments or settings made for a next available frame, and during an idle period 442 for a frame that has not yet been processed during a Tx time 436 by the ISP. As shown on FIGS. 4A-4B by one example, the 3A processing has been delayed and is too late to be processed during the idle 442 shown, and in turn the deadline for frame FN, so that frames processed during the ISP processing period 436 just after idle 442 will not receive their appropriate adjustments until frame FN+1. Alternatively, if the 3A processing is for the next idle after frame FN (not shown) and can make the deadline for frame FN+1, the updated data 192 may be received to update a next ISP Tx 436 period since the next idle has not occurred yet.

Thereafter, the process 500 may continue to apply 540 post-processing. Here, after the WB gains are used for processing of the image data, the image data may proceed to post-processing 540 of the image data. Post-processing may include CFA (Color Filter Array) interpolation, color space conversion, (such as raw RGB to sRGB where not performed already, for example), gamma correction, RGB to YUV conversion, image sharpening, and so on. The post processing may be performed by a processor such as the ISP 408 or other processor mentioned herein, for performing these processes by software and/or the ISP's hardware pipelines.

Next, for final or preview display of the frame or image, storage for later use for example, and/or encoding, or any combination of these 542. The processed image may be displayed 542 whether as a view-finder or preview on a digital camera or phone screen, or a final display on another device, or may be stored for later viewing, and may be video or a still image. Alternatively, or additionally, the image data may be provided to an encoder for compression and transmission to another display or storage device. Upon the stopping of recording or image capture, the camera may be closed 544, or otherwise the system may continue with capture of new images.

Figure 9:
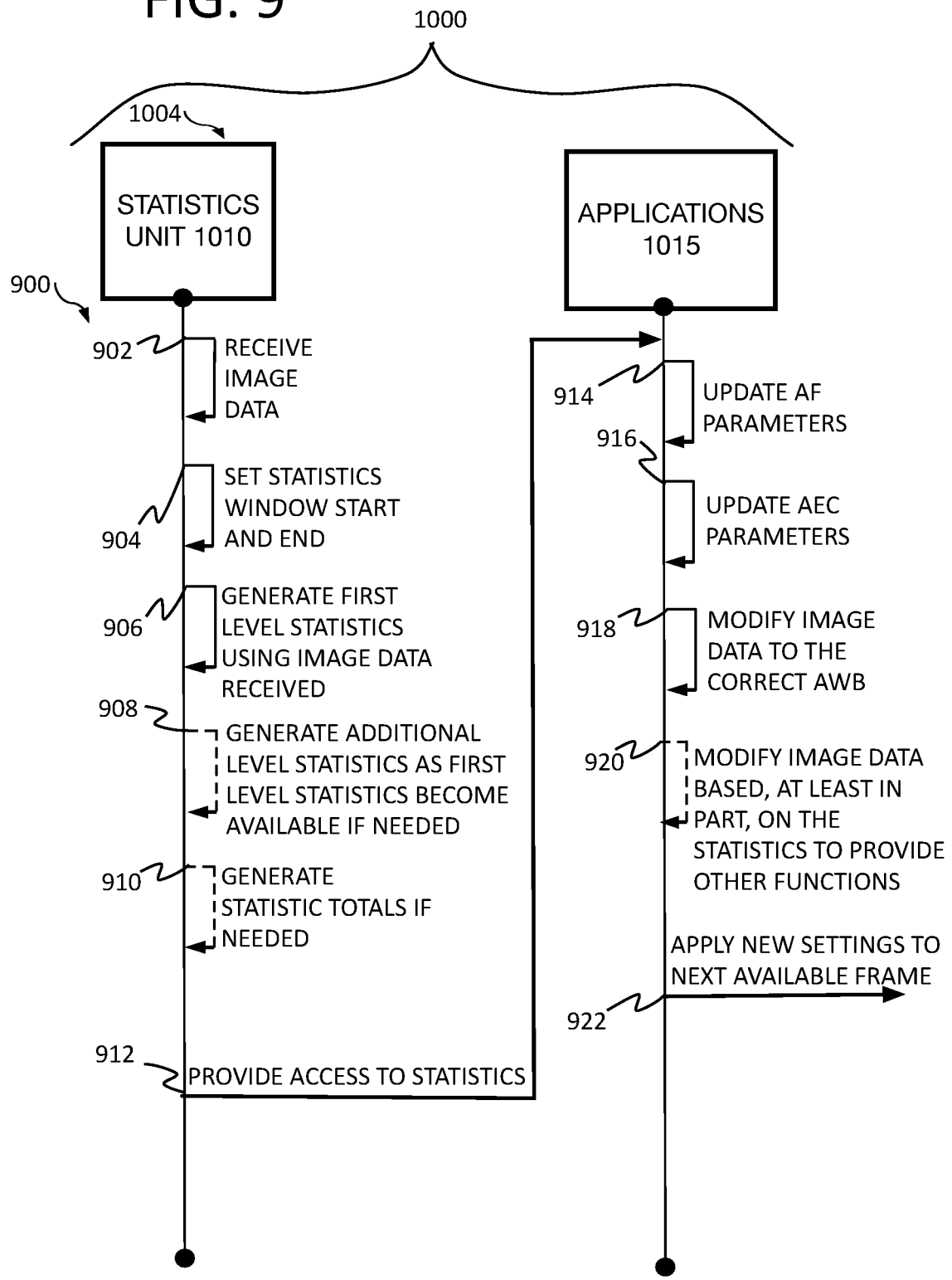
FIG. 9 is a method of method of camera control and image processing with a multi-frame-based window for image data statistics in operation by an image processing device in accordance with at least one of the implementations herein.

Referring to FIG. 9, process 900 illustrates the basic operation of a sample image processing system 1000 for camera control and image processing with a multi-frame-based window for image data statistics in accordance with at least some implementations of the present disclosure. In more detail, in the illustrated form, process 900 may include one or more operations, functions or actions as illustrated by one or more of actions 902 to 922 numbered evenly. By way of non-limiting example, process 900 will be described herein with reference to FIG. 10. Specifically, system 1000 includes a statistics unit 1010 and applications that use the statistics 1015. The operation of the system may proceed as follows.

Process 900 may include "receive image data" 902, and as explained above, as captured by integration by using a rolling shutter in one example, where the raw image data is preprocessed sufficiently for statistics generation and gathering as described above.

Process 900 may include "set statistics window start and end" 904, also as described above, to set the start and end of a multi-frame statistics gathering window during which one part of the window is on a first frame (such as frame FN−1) and another part of the window extends over a second frame (such as next or second frame FN). The end of the window may be set so that statistics generation may be complete by a deadline that permits use of the statistics to generate new parameters when warranted, and apply those parameters so that a certain frame is affected by the application, such as frame FN, frame FN+1, or another subsequent target frame. As mentioned, a number of different factors may affect the start and end of the window including statistics that are provided for a certain ROI for example.

Process 900 may include "generate first level statistics using image data received" 906, and referring to using the image data to generate statistics that can be computed as the image data is being retrieved, such as gradients for example, and that do not require the entire frame's worth of data to compute during the window or other statistics to compute another level of statistics.

Process 900 may include "generate additional level statistics as first level statistics become available if needed" 908, and thus a second or further computation, such as gradient sums per some unit such as for integration row or pixel lines, or blocks, for example.

Process 900 may include "generate statistics total if needed" 910, and where the entire frame's worth of data from the window, and from both frames (FN−1 and FN) are needed to make the computation. By one example, this may be an average color component or intensity (luminance) level for a frame (or really the virtual frame) formed by using the image data used for the window over the two frames FN−1 and FN.

Process 900 may include "provide access to statistics" 912, and by retrieving the statistics from RAM (or DRAM), or when an OTF mode is being used, retrieving the statistics from a more local memory than RAM such as the ISP registers that analyze the statistics as the statistics are being generated by one example. The OTF mode may be a partial or full OTF mode as described above with systems 700 or 800 respectively.

Process 900 then may include operations to determine whether new parameters are needed, generate those new parameters if so to "update AF parameters" 914, "update AEC parameters" 916, and/or "modify image data to the correct AWB" 918, as these operations are described above.

When the multi-frame statistics gathering window is used to collect other general statistics to provide parameters or modify display data, process 900 may include "modify image data based, at least in part, on the statistics to provide other functions" 920. This may include statistics for DVS or dynamic range conversion, such as LTMs or GTMs, to name a few example features, and as mentioned above.

Process 900 may include "apply new settings to next available frame" 922, and also as described above, whether 3A or other features are being used. When the multi-frame statistics gathering window overlaps frames FN−1 and frame FN, settings may affect the capture and display of at least part of frame FN itself at least with AF, and possibly with AEC and AWB when partial or full OTF mode is being used. Otherwise, at least part of frame FN+1 may be improved, and the whole frame FN+1 when the OTF modes are being used.

In addition, any one or more of the operations of the processes in FIGS. 1-9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
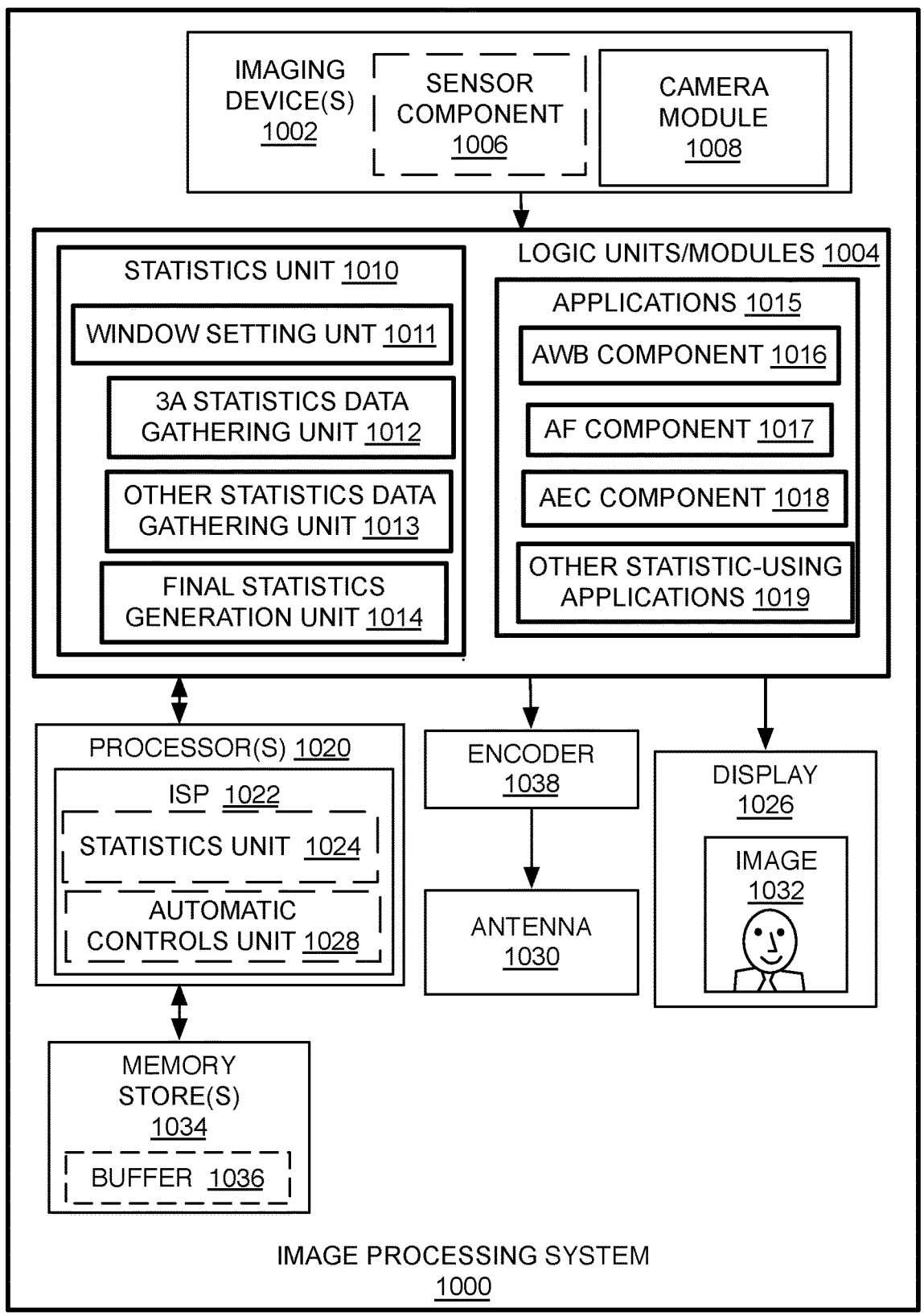
FIG. 10 is an illustrative diagram of an example image processing system

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be a digital camera or other image capture device, and imaging device 1002, in this case, may be the camera hardware and camera sensor software, module, or component 1008. In other examples, imaging processing system 1000 may have an imaging device 1002 that includes or may be a camera, and logic modules 1004 may communicate remotely with, or otherwise may be communicatively coupled to, the imaging device 1002 for further processing of the image data.

In either case, such technology may include a camera such as a digital camera system, a dedicated camera device, or an imaging phone, whether a still picture or video camera or some combination of both. Thus, in one form, imaging device 1002 may include camera hardware and optics including one or more sensors as well as auto-focus, zoom, aperture, ND-filter, auto-exposure, flash, and actuator controls. These controls may be part of a sensor module or component 1006 for operating the sensor. The sensor component 1006 may be part of the imaging device 1002, or may be part of the logical modules 1004 or both. Such sensor component can be used to generate images for a viewfinder and take still pictures or video. The imaging device 1002 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types as long as a multi-frame statistics gathering window can be used. In other examples, an RGB-Depth camera and/or microphone-array might be used in addition to or in the alternative to a camera sensor. In some examples, imaging device 1002 may be provided with an eye tracking camera.

In the illustrated example, the logic modules 1004 may include a statistics unit 1010 that has a window setting unit 1011 to set the start and end of the multi-frame statistics gathering window, a 3A statistics data gathering unit 1012 and other statistics gathering unit 1013 that perform the statistics computations, and a final statistics generation unit 1014 that computes upper level statistics or frame-level statistics as described above. The logic unit 1004 also may have applications 1015 that use the statistics such as an automatic white balancing control or component 1016, an automatic focus (AF) component 1017, and an automatic exposure control (AEC) module or component 1018. A statistics unit 1010 (as unit 1024) and/or the applications 1015 (as unit 1028) may be provided as part of the logic modules and/or on board a processor 1020 such as an ISP 1022. This may include the instructions for operating the units, the statistical data that is being analyzed by the units, and which may be held in registers as described above, or both. The logic modules 1004 may be communicatively coupled to the imaging device 1002 in order to receive the raw image data and embedded data described herein. Otherwise, a memory store(s) 1034 may be provided to store the statistics data in a buffer 1036 formed of RAM such as DRAM.

The image processing system 1000 may have one or more of the processors 1020 which may include the dedicated image signal processor (ISP) 1022 such as the Intel Atom, memory stores 1024, one or more displays 1026, encoder 1038, and antenna 1030. In one example implementation, the image processing system 100 may have the display 1026, at least one processor 1020 communicatively coupled to the display, at least one memory 1024 communicatively coupled to the processor and having the buffer 1036 by one example for storing 3A and other statistics data. The encoder 1028 and antenna 1030 may be provided to compress the modified image date for transmission to other devices that may display or store the image. It will be understood that the image processing system 1000 may also include a decoder (or encoder 1028 may include a decoder) to receive and decode image data for processing by the system 1000. Otherwise, the processed image 1032 may be displayed on display 1026 or stored in memory 1024. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
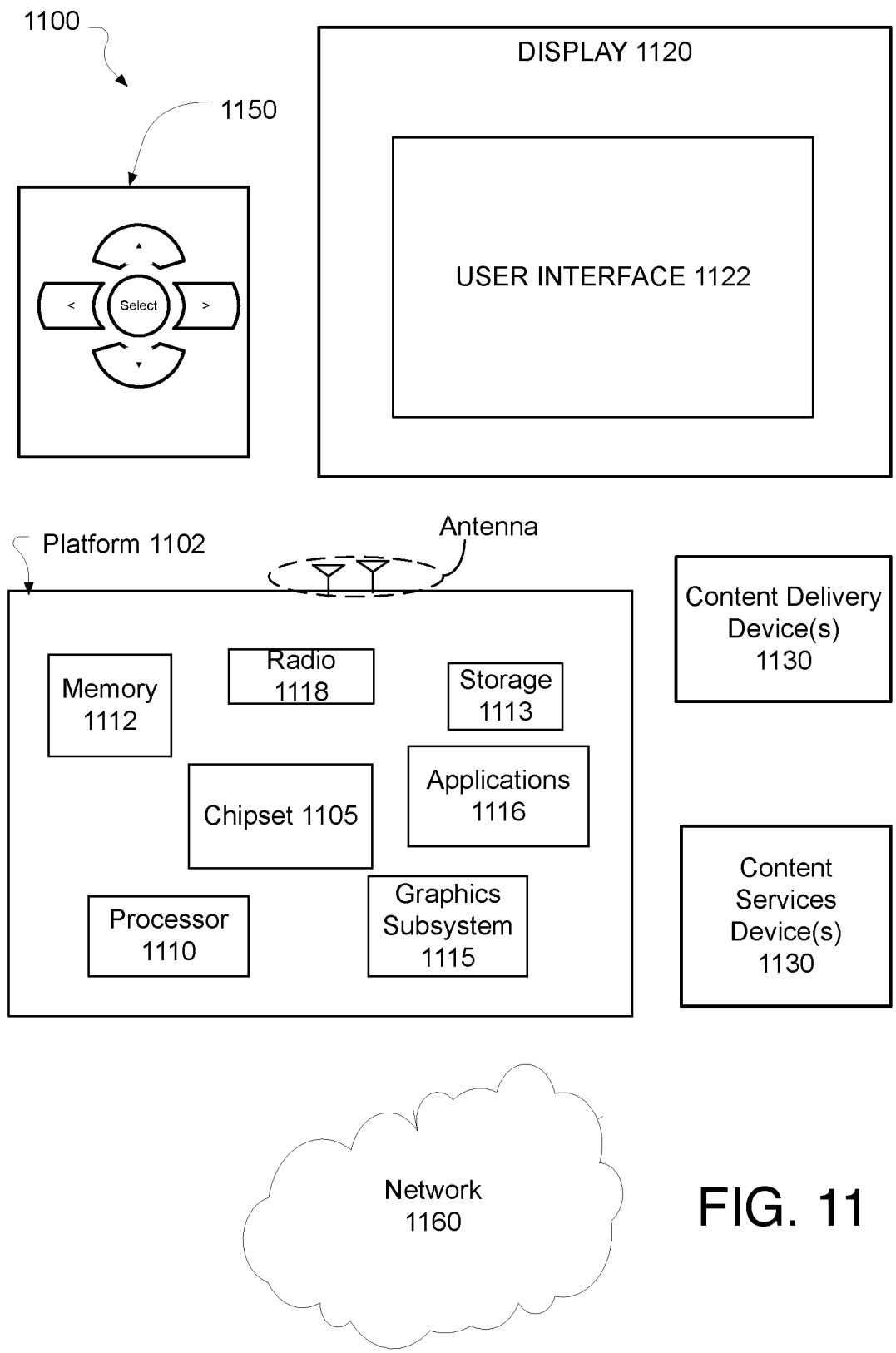
FIG. 11 is an illustrative diagram of an example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system described above. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Referring to FIG. 12, a small form factor device 1200 is one example of the varying physical styles or form factors in which systems 1000 or 1100 may be embodied. By this approach, device 1200 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 1214, or may be digitized by a voice recognition device. As shown, device 1200 may include a camera 1205 (e.g., including at least one lens, aperture, and imaging sensor) and a flash 1210 integrated into back 1202 (or elsewhere) of device 1200. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of image processing, comprising: receiving captured image data of frames of a video sequence; generating a representation of a single frame of image data statistics comprising providing the option to use image data of one, two, or more frames to generate the statistics; and permitting access to the representation of the single frame of image data statistics to set image capture parameters to capture a next available frame of the video sequence or modify image data to process a next available frame of the video sequence or both.

By another implementation, the method comprises wherein the image data statistics comprise 3A statistics for at least one of: automatic white balance, automatic focus, and automatic exposure control, digital video stabilization statistics, local tone mapping (LTM) statistics, global tone mapping (GTM), and dynamic range conversion statistics; wherein the next available frame is the later frame of the two frames used to represent the single frame of image data statistics, or wherein the next available frame is the immediately next frame after the later frame of the two frames used to represent the single frame of image data statistics; wherein the representation of the single frame of image data statistics represents is a spatial representation having the same number and arrangement of pixels as a single frame and based on pixel values from both of the two frames. The method comprising: using the image data of lower integration or pixel lines of a previous frame and the image data of upper integration or pixel lines of a subsequent frame to form the representation of the single frame of image data statistics; and generating statistics during a statistics gathering window that starts on a first frame and ends on a second frame wherein the first and second frames are the two frames.

The method also may include at least one of: (1) wherein statistics are generated during the window by using image data of the same total number of rows of integration or pixels as in a single frame, and (2) wherein statistics are generated during the window by using image data of a different number of rows of pixels from the two frames of the two frames; wherein the window extends substantially continuously from one frame to the next frame so that statistics processing continues during a vertical blank time between transmission of raw image data from sensors; wherein the start or end or both of the window depends, at least in part, on the time needed to generate statistics to be used by an application rather than solely corresponding to the start or end of the exposure time of a single frame. The method comprising at least one of: (1) holding generated statistics determined by using image data of only one of the two frames more locally, relative to a processor generating the statistics, than random access memory to use the statistics to determine camera parameters or display modifications while storing the generated statistics of the other of the two frames on random access memory; (2) scaling comprising matching the statistics of one of the frames to the statistics of the other frame of the two frames to form the representation of a single frame of image data statistics; and (3) processing differences in statistics from one frame to another frame comprising using image data of more than one frame to form the representation of a single frame of image data statistics that are used to target a specific camera or display parameter.

By yet another implementation, a system for image processing, comprising: an image capture device to capture frames of a video sequence; at least one processor communicatively coupled to the image capture device; at least one memory communicatively coupled to at least one processor; and a statistics unit operated by the processor, and being configured to operate by: receiving captured image data of the frames of the video sequence; generating a representation of a single frame of image data statistics using a statistics gathering time window that extends over at least two frames and comprising having the option to use image data of one, two, or more frames to generate the representation of the single frame of image data statistics; and permitting access to the representation of the single frame of image data statistics to set image capture parameters to capture a next available frame of the video sequence or modify image data to process a next available frame of the video sequence or both.

By another example, the system comprising holding the image data or statistics or both more locally than a random access memory (RAM) without storing the image data or statistics or both in RAM to process the image data and statistics to generate camera parameters or modify image data for display of an image; and the system comprising at least one of: (1) holding the image data or statistics or both of only one of the frames of the at least two frames more locally than the RAM to use the image data or statistics or both to generate the camera parameters or modify image data to process an image to display the image; (2) wherein the at least two frames comprises two frames, and the method comprising holding the image data statistics of both of the two frames more locally than the RAM to use the image data statistics to generate the camera parameters or modify image data to display an image; and (3) the system comprising holding the image data or statistics or both in at least one image signal processor (ISP) registers rather than storing the image data or statistics or both in random access memory to use the image data and statistics to form the camera parameters or modify the image data for display of the image; wherein the window start is set at the same fixed location of each window start frame relative to the integration or pixel row lines of the frame; wherein the window start is set depending, at least in part, on both (1) when sufficient image data is obtained to generate statistics, and (2) when the image data is provided that is not already used to generate statistics of a previous window; wherein the start and end of the window are associated with a region of interest (ROI) on the frames so that image data outside of the region of interest is not collected to compute statistics based on the ROI.

By a further example, the system comprises wherein the representation of the single frame of image data statistics represents the same number and arrangement of pixels as a single frame and based on pixel values from both of the at least two frames; and wherein the instructions cause the computing device to operate by generating statistics during a statistics gathering window that starts on a previous frame and ends on a subsequent frame wherein the previous and subsequent frames are the at least two frames, and wherein a start or end or both of the window are free to be at different positions from frame to frame and relative to the integration or pixel row lines forming a frame.

By one approach, an article having a readable medium comprises a plurality of instructions that in response to being executed on a computing device, causes the computing device to operate by receiving captured image data of frames of a video sequence; generating a representation of a single frame of image data statistics comprising providing the option to use image data of one, two, or more frames to generate the statistics; and permitting access to the representation of the single frame of image data statistics to use the image data statistics to set image capture parameters to capture a next available frame of the video sequence or modify image data to process a next available frame of the video sequence or both.

By another approach, the instructions cause the computing device to include that wherein the representation of the single frame of image data statistics represents the same number and arrangement of pixels as a single frame and based on pixel values from both of the at least two frames; and wherein the instructions cause the computing device to operate by generating statistics during a statistics gathering window that starts on a previous frame and ends on a subsequent frame wherein the previous and subsequent frames are the at least two frames, and wherein a start or end or both of the window are free to be at different positions from frame to frame and relative to the integration or pixel row lines forming a frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
receiving captured image data of frames of a video sequence;
generating a representation of a single frame of image data statistics comprising providing the option to use image data of one, two, or more frames to generate the statistics, wherein the representation is formed by setting pixel data of integration lines to be added to the representation depending on the integration line, wherein the integration lines are image divisions used by a shutter used to capture the image data; and
permitting access to the representation of the single frame of image data statistics to set image capture parameters to capture a next available frame of the video sequence or modify image data to process a next available frame of the video sequence or both;
wherein the representation of the single frame of image data statistics is a spatial representation having the same number and arrangement of pixels as a single frame of the captured image data and based on pixel values from two frames to generate the statistics.

2. The method of claim 1 wherein the image data statistics comprise 3A statistics for at least one of: automatic white balance, automatic focus, and automatic exposure control.

3. The method of claim 1 wherein the image data statistics comprise at least one of digital video stabilization statistics, local tone mapping (LTM) statistics, global tone mapping (GTM), and dynamic range conversion statistics.

4. The method of claim 1 wherein the next available frame is the later frame of the two frames to generate the statistics.

5. The method of claim 1 wherein the next available frame is the immediately next frame after the later frame of the two frames to generate the statistics.

6. The method of claim 1 comprising using the image data of lower integration lines of a previous frame and the image data of upper integration lines of a subsequent frame to form the representation of the single frame of image data statistics, and wherein pixel data of less than all integration lines of an entire image of each image contributing to form the representation are used to form the representation.

7. The method of claim 1 comprising generating statistics during a statistics gathering window that starts on a first frame and ends on a second frame wherein the first and second frames are the two frames.

8. The method of claim 7 wherein statistics are generated during the window by using image data of the same total number of rows of integration as in a single frame.

9. The method of claim 7 wherein statistics are generated during the window by using image data of a different number of rows of pixels of the two frames.

10. The method of claim 7 wherein the window extends substantially continuously from the first frame to the second frame so that statistics processing continues during a vertical blank time between transmission of raw image data from sensors.

11. The method of claim 7 wherein the start or end or both of the window depends, at least in part, on the time needed to generate statistics to be used by an application rather than solely corresponding to the start or end of an exposure time of a single frame.

12. The method of claim 1 comprising holding generated statistics determined by using image data of only one of the two frames more locally, wherein more locally refers to being in image signal processor (ISP) registers rather than random access memory (RAM), and relative to a processor generating the statistics, to use the statistics to determine camera parameters or display modifications while storing the generated statistics of the other of the two frames on random access memory.

13. The method of claim 1 comprising scaling comprising matching statistics of one of the frames to the statistics of the other frame of the two frames to generate the statistics to form the representation of a single frame of image data statistics.

14. The method of claim 1 comprising processing differences in statistics from one frame to another frame comprising using image data of more than one frame to form the representation of a single frame of image data statistics that are used to target a specific camera or display parameter.

15. A system for image processing, comprising:
an image capture device to capture frames of a video sequence;
at least one processor communicatively coupled to the image capture device;
at least one memory communicatively coupled to at least one processor; and
a statistics unit operated by the processor, and being configured to operate by:
receiving captured image data of the frames of the video sequence;
generating a representation of a single frame of image data statistics using a statistics gathering time window that extends over at least two frames and comprising having the option to use image data of one, two, or more frames to generate the representation of the single frame of image data statistics, wherein the representation is formed by setting pixel data of integration lines to be added to the representation depending on the integration line, wherein the integration lines are image divisions used by a shutter used to capture the image data; and
permitting access to the representation of the single frame of image data statistics to set image capture parameters to capture a next available frame of the video sequence or modify image data to process a next available frame of the video sequence or both,
wherein the representation of the single frame of image data statistics is a spatial representation having the same number and arrangement of pixels as a single frame of the captured image data and based on pixel values from two frames to generate the statistics.

16. The system of claim 15 comprising holding the image data or statistics or both more locally, wherein more locally refers to being in image signal processor (ISP) registers rather than random access memory (RAM), and without storing the image data or statistics or both in the RAM to process the image data and statistics to generate camera parameters or modify image data for display of an image.

17. The system of claim 16 comprising holding the image data or statistics or both of only one of the frames of the at least two frames more locally than the RAM to use the image data or statistics or both to generate the camera parameters or modify image data to process an image to display the image.

18. The system of claim 16 wherein the at least two frames comprises two frames, and the method comprising holding the image data statistics of both of the two frames more locally than the RAM to use the image data statistics to generate the camera parameters or modify image data to display an image.

19. The system of claim 15 wherein a statistics gathering time window is provided for multiple frames, and wherein each statistics gathering time window has a window start that is set at a same fixed location of a window start frame relative to the integration or pixel row lines of the frame for each statistics gathering time window.

20. The system of claim 15 wherein the window start is set depending, at least in part, on both (1) when an amount of image data can be obtained to generate statistics from a predetermined number of integration lines on a start first frame, and (2) when the image data is provided that is not already used to generate statistics of a previous window.

21. The system of claim 15 wherein the start and end of the window are associated with a region of interest (ROI) on the frames so that image data outside of the region of interest is not collected to compute statistics based on the ROI.

22. An article having a computer readable medium comprising a plurality of instructions that in response to being executed on a computing device, cause the computing device to operate by:
receiving captured image data of frames of a video sequence;
generating a representation of a single frame of image data statistics comprising providing the option to use image data of one, two, or more frames to generate the statistics wherein the representation is formed by setting pixel data of integration lines to be added to the representation depending on the integration line, wherein the integration lines are image divisions used by a shutter used to capture the image data; and
permitting access to the representation of the single frame of image data statistics to use the image data statistics to set image capture parameters to capture a next available frame of the video sequence or modify image data to process a next available frame of the video sequence or both, wherein the shutter is a rolling shutter, and pixel data of integration lines from different images and that have overlapping integration times are used to form at least part of the representation.

23. The article according to claim 22, wherein the representation of the single frame of image data statistics represents the same number and arrangement of pixels as a single frame of captured image data and based on pixel values from two frames to generate the statistics; and
wherein the instructions cause the computing device to operate by generating statistics during a statistics gathering window that starts on a previous frame and ends on a subsequent frame wherein the previous and subsequent frames are the two frames, and wherein a start or end or both of the window are free to be at different positions from frame to frame and relative to the integration lines forming a frame.

24. The article of claim 22, wherein the integration lines with overlapping integration times are at different heights relative to each other and respectively on the different images.

* * * * *